(12) United States Patent
Fournier et al.

(10) Patent No.: US 9,555,775 B2
(45) Date of Patent: Jan. 31, 2017

(54) CONNECTORS AND CONNECTOR KIT FOR ATTACHMENT OF A WINDSHIELD WIPER BLADE TO MULTIPLE TYPES OF WINDSHIELD WIPER ARMS

(71) Applicant: Illinois Tool Works Inc., Glenview, IL (US)

(72) Inventors: James C. Fournier, Gurnee, IL (US); Stanislaw Piotrowski, Addison, IL (US); Anders Olof Rostlund, Chicago, IL (US); Kenneth H. Teal, Houston, TX (US); Mark Kurth, Beverly Shores, IN (US); Subramaniam Shanmugham, Sugar Land, TX (US); Ashok Darisipudi, Aurora, IL (US); Liliana Minevski, The Woodlands, TX (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 574 days.

(21) Appl. No.: 13/836,529

(22) Filed: Mar. 15, 2013

(65) Prior Publication Data

US 2014/0259505 A1 Sep. 18, 2014

(51) Int. Cl.
*B60S 1/40* (2006.01)
*B60S 1/38* (2006.01)

(52) U.S. Cl.
CPC .............. *B60S 1/4003* (2013.01); *B60S 1/387* (2013.01); *B60S 1/4006* (2013.01); *B60S 1/4009* (2013.01);
(Continued)

(58) Field of Classification Search
CPC ..... B60S 1/4019; B60S 1/4003; B60S 1/4006; B60S 1/4009; B60S 1/4038; B60S 2001/4051
See application file for complete search history.

(56) References Cited

U.S. PATENT DOCUMENTS 3,588,941 A 6/1971 Schlesinger
3,641,614 A 2/1972 Newsome
(Continued)

FOREIGN PATENT DOCUMENTS

CN 2188518 Y 2/1995
CN 2200568 Y 6/1995
(Continued)

OTHER PUBLICATIONS

International Search Report and Written Opinion for PCT application No. PCT/US2014/016732 mailed Nov. 6, 2014.
(Continued)

*Primary Examiner* — Michael Jennings
(74) *Attorney, Agent, or Firm* — Brinks Gilson & Lione

(57) ABSTRACT

A kit for connecting a wiper blade and multiple types of wiper arms, the kit including a container and a set of connectors located within an interior of the container. The set of connectors includes a first connector having a structure to receive and be connected to at least two different wiper arms that are part of a first class of wiper arms. The set of connectors includes a second connector having a structure to receive and be connected to at least two different wiper arms that are part of a second class of wiper arms. The set of connectors includes a third connector having a structure to receive and be connected to at least two different wiper arms that are part of a third class of wiper arms, wherein the first class, the second class and the third class are different from one another.

18 Claims, 17 Drawing Sheets

(52) U.S. Cl.
CPC ......... *B60S 1/4038* (2013.01); *B60S 2001/408* (2013.01); *B60S 2001/4032* (2013.01); *B60S 2001/4035* (2013.01); *B60S 2001/4051* (2013.01); *B60S 2001/4054* (2013.01)

(56) References Cited

U.S. PATENT DOCUMENTS

| | | |
|---|---|---|
| 3,757,377 A | 9/1973 | Hayhurst |
| 4,023,232 A | 5/1977 | Smithers |
| 4,057,869 A | 11/1977 | Longman et al. |
| 4,290,164 A | 9/1981 | van den Berg |
| 4,321,725 A | 3/1982 | Journee |
| 4,450,602 A | 5/1984 | Maiocco |
| 5,084,933 A | 2/1992 | Buechele |
| 5,289,608 A | 3/1994 | Kim |
| 5,392,487 A | 2/1995 | Yang |
| 5,606,765 A | 3/1997 | Ding |
| 5,618,124 A | 4/1997 | Chen |
| 5,920,950 A | 7/1999 | Young, III et al. |
| 5,970,569 A | 10/1999 | Merkel et al. |
| 6,055,697 A | 5/2000 | Wollenschlaeger |
| 6,192,546 B1 | 2/2001 | Kotlarski |
| 6,202,251 B1 | 3/2001 | Kotlarski |
| 6,209,166 B1 | 4/2001 | Westermann et al. |
| 6,263,538 B1 | 7/2001 | Westermann et al. |
| 6,301,741 B1 | 10/2001 | Westermann et al. |
| 6,675,432 B1 | 1/2004 | De Block |
| 6,687,948 B2 | 2/2004 | Kotlarski |
| 6,779,223 B1 | 8/2004 | Roekens |
| 7,028,368 B2 | 4/2006 | Lee et al. |
| 7,055,207 B2 | 6/2006 | Coughlin |
| 7,159,267 B2 | 1/2007 | Son |
| 7,287,296 B2 | 10/2007 | Vacher |
| 7,305,734 B2 | 12/2007 | Boland et al. |
| 7,341,396 B2 | 3/2008 | Huang |
| 7,350,259 B2 | 4/2008 | Walworth et al. |
| 7,421,755 B2 | 9/2008 | Kinoshita et al. |
| 7,434,291 B2 | 10/2008 | Chiang |
| 7,506,401 B2 | 3/2009 | Park |
| 7,581,279 B2 | 9/2009 | Baseotto et al. |
| 7,587,782 B2 | 9/2009 | Inoue |
| 7,607,194 B2 | 10/2009 | Weber et al. |
| 7,621,016 B2 | 11/2009 | Verelst et al. |
| 7,634,833 B2 | 12/2009 | Boland et al. |
| 7,669,276 B2 | 3/2010 | Verelst et al. |
| 7,669,277 B2 | 3/2010 | Inoue |
| 7,716,780 B2 | 5/2010 | Scholl et al. |
| 7,823,247 B2 | 11/2010 | Poton |
| 7,827,652 B2 | 11/2010 | Yang et al. |
| 7,886,401 B2 | 2/2011 | Weber et al. |
| 7,891,044 B2 | 2/2011 | Fink et al. |
| 7,908,703 B2 | 3/2011 | Van Bealen |
| 7,937,798 B2 | 5/2011 | Fink et al. |
| 7,950,101 B2 | 5/2011 | Kim |
| 7,979,950 B2 | 7/2011 | Boland |
| 8,069,528 B2 | 12/2011 | Verelst et al. |
| 8,191,201 B2 | 6/2012 | De Block et al. |
| 8,220,106 B2 | 7/2012 | Fink et al. |
| 8,230,547 B2 | 7/2012 | Wilms et al. |
| 8,261,403 B2 | 9/2012 | Ehde |
| 8,286,298 B2 | 10/2012 | Kim |
| 8,370,986 B2 | 2/2013 | Wilms et al. |
| 8,397,341 B2 * | 3/2013 | Ehde ............... B60S 1/4003 15/250.32 |
| 8,479,349 B2 | 7/2013 | Boland et al. |
| 8,479,350 B2 | 7/2013 | Kim et al. |
| 8,484,794 B2 | 7/2013 | Westermann et al. |
| 8,490,239 B2 | 7/2013 | Ehde |
| 8,505,151 B2 | 8/2013 | Depondt et al. |
| 8,505,152 B2 | 8/2013 | Boland |
| 8,544,137 B2 | 10/2013 | Thienard |
| 8,549,696 B2 | 10/2013 | Boland et al. |
| 8,555,456 B2 | 10/2013 | Ehde |
| 8,595,889 B2 | 12/2013 | Op't Roodt et al. |
| 8,615,841 B2 | 12/2013 | Kim et al. |
| 8,719,994 B2 | 5/2014 | Thienard et al. |
| 2002/0192017 A1 | 12/2002 | Rosenstein et al. |
| 2003/0066153 A1* | 4/2003 | Rosenstein ........... B60S 1/4003 15/250.32 |
| 2004/0123414 A1 | 7/2004 | Lee |
| 2005/0091793 A1 | 5/2005 | Huang |
| 2006/0207050 A1* | 9/2006 | Shanmugham ......... B60S 1/381 15/250.43 |
| 2007/0226940 A1 | 10/2007 | Thienard |
| 2008/0058195 A1 | 3/2008 | Chiang |
| 2009/0151110 A1 | 6/2009 | Ku |
| 2009/0199357 A1* | 8/2009 | Thienard ............... B60S 1/3853 15/250.32 |
| 2009/0307862 A1 | 12/2009 | Boland |
| 2010/0005609 A1* | 1/2010 | Kim .................. B60S 1/387 15/250.32 |
| 2010/0024149 A1 | 2/2010 | Erdal |
| 2010/0050361 A1* | 3/2010 | Chang ............... B60S 1/387 15/250.32 |
| 2010/0146727 A1 | 6/2010 | Coemans et al. |
| 2010/0186185 A1 | 7/2010 | Grasso et al. |
| 2010/0205763 A1 | 8/2010 | Ku |
| 2011/0005020 A1 | 1/2011 | Koppen et al. |
| 2011/0056041 A1 | 3/2011 | Wu |
| 2011/0056042 A1* | 3/2011 | Fink .................... B60S 1/38 15/250.32 |
| 2011/0072607 A1* | 3/2011 | Van Baelen ......... B60S 1/3856 15/250.32 |
| 2011/0113583 A1 | 5/2011 | Shanmugham et al. |
| 2011/0247166 A1* | 10/2011 | Depondt ................ B60S 1/387 15/250.32 |
| 2012/0047673 A1 | 3/2012 | Depondt |
| 2012/0060315 A1 | 3/2012 | Avasiloaie et al. |
| 2012/0060316 A1 | 3/2012 | Avasiloaie et al. |
| 2012/0110772 A1 | 5/2012 | Boland |
| 2012/0110773 A1 | 5/2012 | Thielen et al. |
| 2012/0144615 A1* | 6/2012 | Song .................. B60S 1/4003 15/250.32 |
| 2012/0180244 A1 | 7/2012 | Kim et al. |
| 2012/0227206 A1 | 9/2012 | Depondt |
| 2012/0233801 A1* | 9/2012 | Coart .................. B60S 1/3868 15/250.32 |
| 2012/0233802 A1 | 9/2012 | Depondt |
| 2012/0246859 A1* | 10/2012 | Schaeuble ............ B60S 1/3849 15/250.32 |
| 2012/0246860 A1* | 10/2012 | Schaeuble ............ B60S 1/4048 15/250.32 |
| 2012/0260450 A1 | 10/2012 | Fink et al. |
| 2012/0279008 A1 | 11/2012 | Depondt |
| 2013/0007977 A1 | 1/2013 | Depondt |
| 2013/0045332 A1 | 2/2013 | Fang et al. |
| 2013/0067674 A1 | 3/2013 | Chiang |
| 2013/0104334 A1 | 5/2013 | Depondt |
| 2013/0117956 A1* | 5/2013 | Chien .................. B60S 1/4048 15/250.32 |
| 2013/0125331 A1 | 5/2013 | Genet |
| 2013/0152323 A1 | 6/2013 | Chien |
| 2013/0152330 A1 | 6/2013 | Kim et al. |
| 2013/0167317 A1 | 7/2013 | Oslizlo et al. |
| 2013/0180072 A1 | 7/2013 | Boland |
| 2013/0255026 A1 | 10/2013 | Depondt |
| 2013/0305476 A1 | 11/2013 | Smets et al. |
| 2013/0312209 A1 | 11/2013 | Genet |
| 2013/0333145 A1 | 12/2013 | Depondt |
| 2013/0340194 A1 | 12/2013 | Depondt |
| 2013/0343811 A1 | 12/2013 | Depondt |
| 2014/0041143 A1 | 2/2014 | Kim et al. |
| 2014/0068887 A1 | 3/2014 | Lee |
| 2014/0123426 A1 | 5/2014 | Lee |
| 2014/0165321 A1 | 6/2014 | Depondt |
| 2014/0182075 A1* | 7/2014 | Polocoser ............ B60S 1/3849 15/250.32 |

FOREIGN PATENT DOCUMENTS

| | | |
|---|---|---|
| DE | 20 2009 013 452 U1 | 1/2010 |
| DE | 10 2010 030 880 A1 | 1/2012 |
| DE | 20 2012 100 430 U1 | 5/2012 |

(56) References Cited

FOREIGN PATENT DOCUMENTS

| | | | |
|---|---|---|---|
| DE | 20 2012 102 614 U1 | 10/2012 | |
| DE | 10 2011 079 783 A1 | 1/2013 | |
| EP | 1 347 895 B1 | 8/2005 | |
| EP | 1 403 156 B1 | 12/2008 | |
| EP | 2 360 070 A1 | 8/2011 | |
| FR | 2 533 517 A1 | 3/1984 | |
| FR | 2 865 699 B1 | 9/2007 | |
| FR | 2 890 925 B1 | 12/2009 | |
| FR | 2 896 746 B1 | 1/2010 | |
| FR | 2 926 514 B1 | 6/2010 | |
| GB | 1 535 122 | 12/1978 | |
| GB | 2 332 140 A | 6/1999 | |
| IN | WO 2009155230 A1 * | 12/2009 | ............ B60S 1/3867 |
| JP | 4215651 B2 | 1/2009 | |
| JP | 4260745 B2 | 4/2009 | |
| JP | 4870353 B2 | 2/2012 | |
| JP | 4972089 B2 | 7/2012 | |
| JP | 5189476 B2 | 4/2013 | |
| JP | 5335133 B2 | 11/2013 | |
| JP | 5352055 B2 | 11/2013 | |
| JP | 5377772 B2 | 12/2013 | |
| KR | 2001-0058909 A | 7/2001 | |
| KR | 10-824034 B1 | 4/2008 | |
| KR | 10-2009-085357 A | 8/2009 | |
| KR | 10-2009-100975 A | 9/2009 | |
| KR | 10-0932745 B1 | 12/2009 | |
| KR | 10-2010-023942 A | 3/2010 | |
| KR | 10-959035 B1 | 5/2010 | |
| KR | 10-0961622 B1 | 6/2010 | |
| KR | 20-2010-005707 U | 6/2010 | |
| KR | 10-2011-000855 A | 1/2011 | |
| KR | 10-1027384 B1 | 3/2011 | |
| KR | 10-2011-036182 A | 4/2011 | |
| KR | 10-2011-0116521 A | 10/2011 | |
| KR | 102012-029616 A | 3/2012 | |
| KR | 10-1158370 B1 | 6/2012 | |
| KR | 10-1189722 B1 | 10/2012 | |
| KR | 10-1198352 B1 | 11/2012 | |
| KR | 10-1285317 B1 | 7/2013 | |
| WO | WO 2005/082692 A1 | 9/2005 | |
| WO | WO 2011/032760 A1 | 3/2011 | |
| WO | WO 2013/019645 A1 | 2/2013 | |
| WO | WO 2013/019723 A1 | 2/2013 | |
| WO | WO 2013/176352 A1 | 11/2013 | |

OTHER PUBLICATIONS

FR2533517A1 (machine translation), published by European Patent Office on Jul. 15, 2015, pp. 1-7.
U.S. Appl. No. 13/836,333, filed Mar. 15, 2013, Piotrowski et al.
U.S. Appl. No. 13/836,537, filed Mar. 15, 2013, Fournier et al.
U.S. Appl. No. 29/476,553, filed Dec. 13, 2013, Lepper et al.
English language machine translation of German reference 20 2012 102 614, generated by European Patent Office on Dec. 14, 2015, pp. 1-12.

* cited by examiner

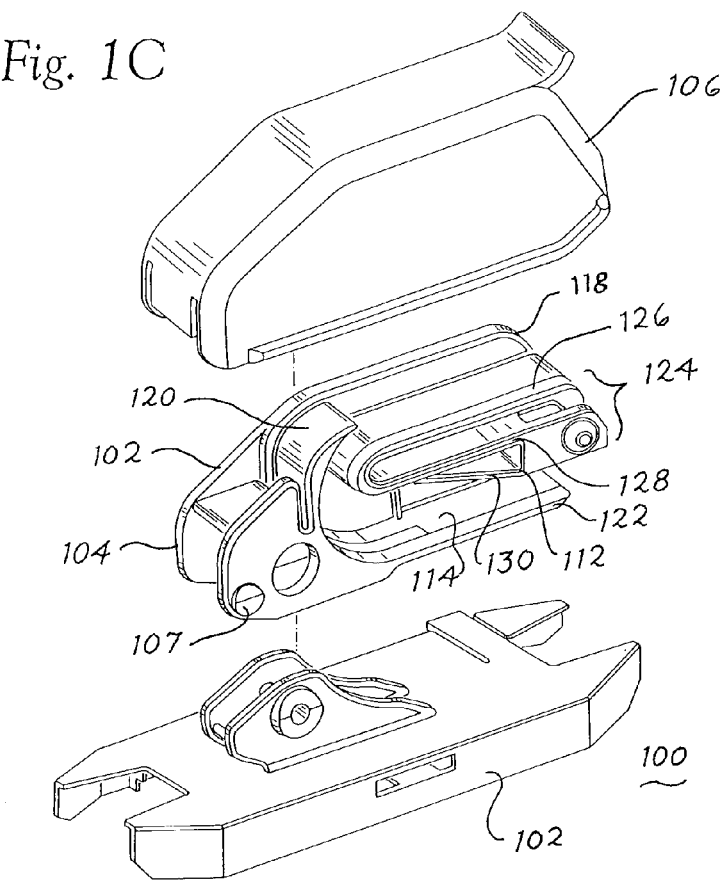
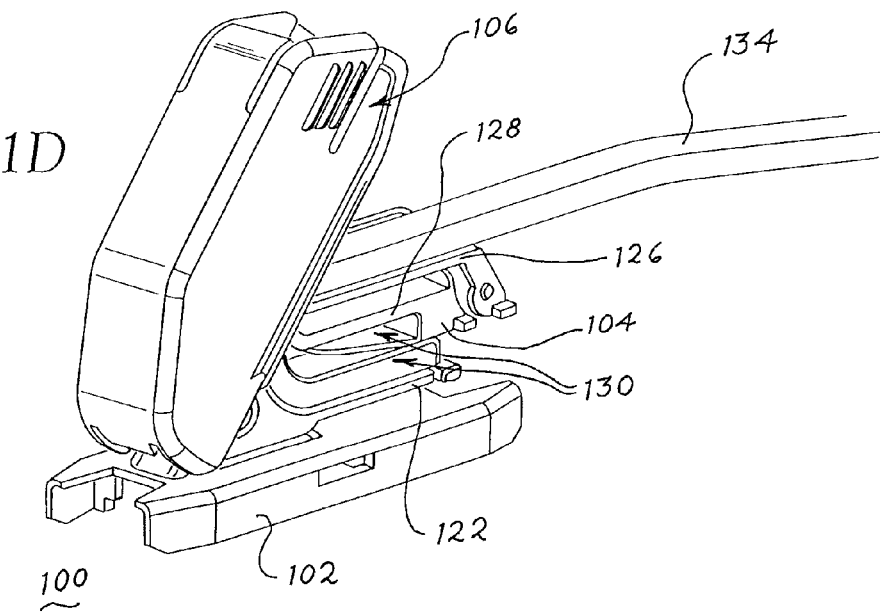

Fig. 8A
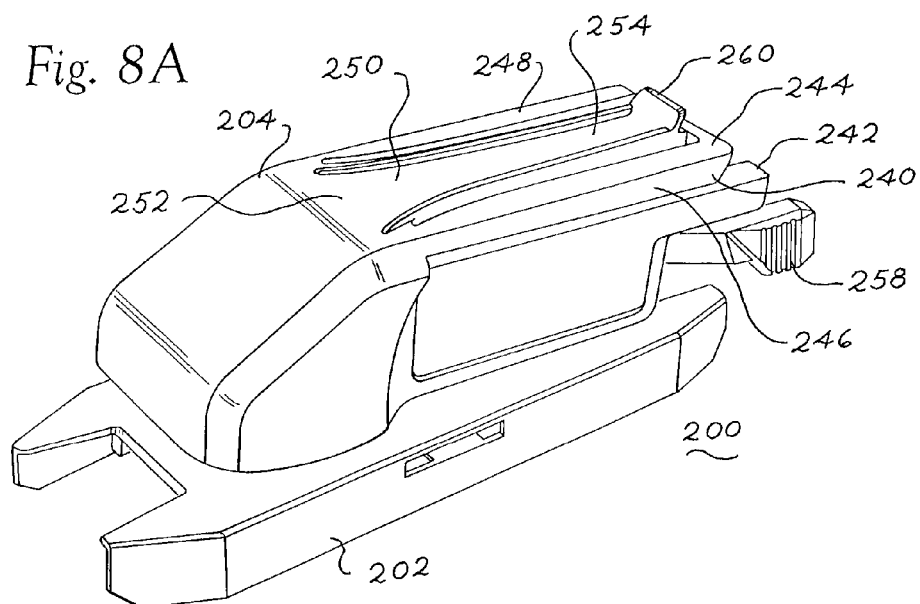
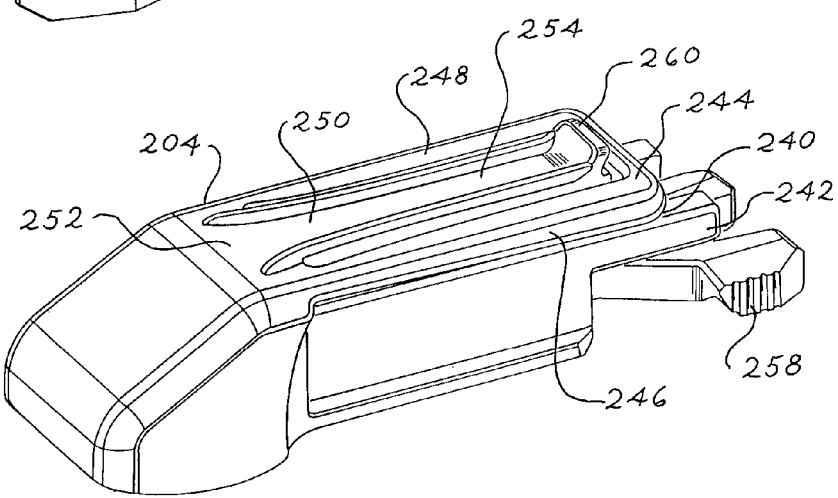
Fig. 8B
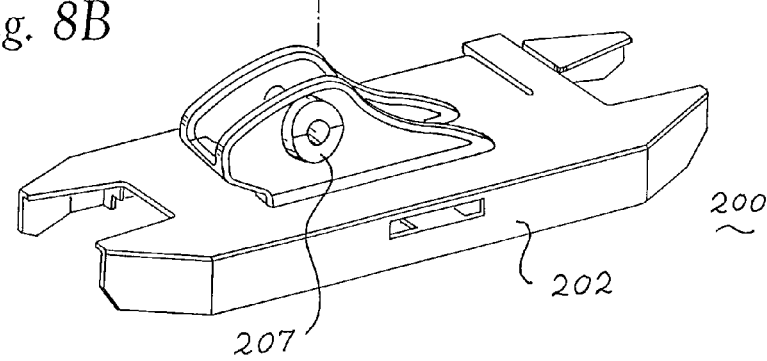

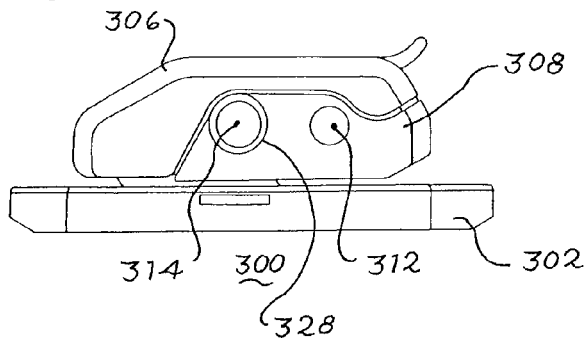
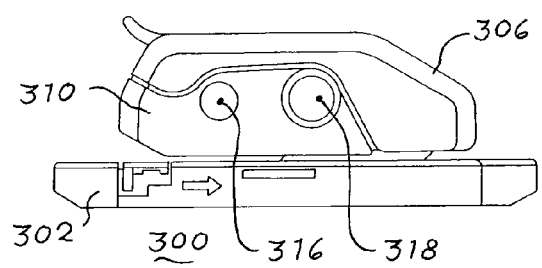
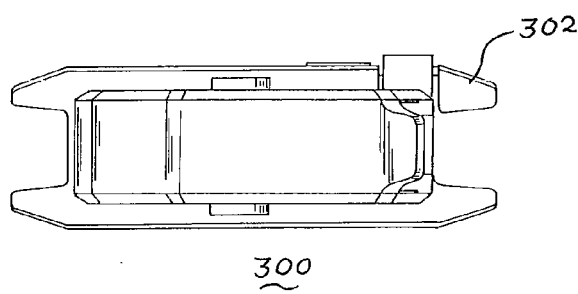
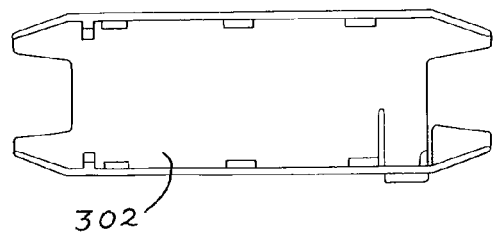
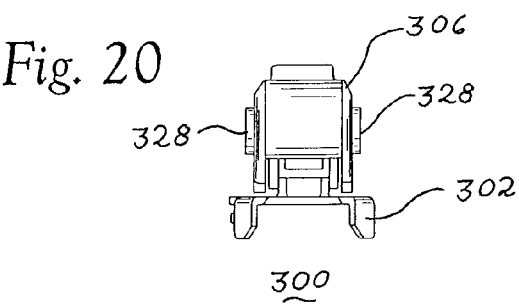
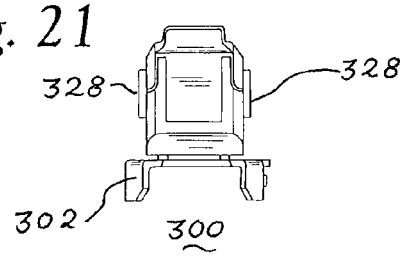

Fig. 22A(1)
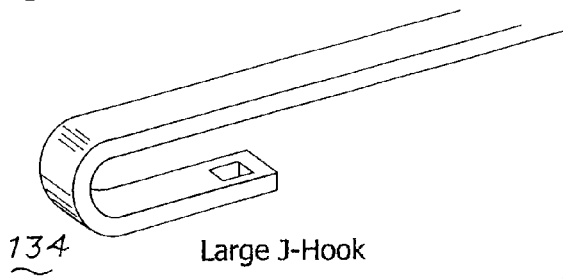
Large J-Hook
Fig. 22A(2)
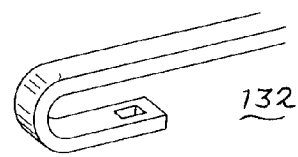
Small J-Hook
Fig. 22B(1)
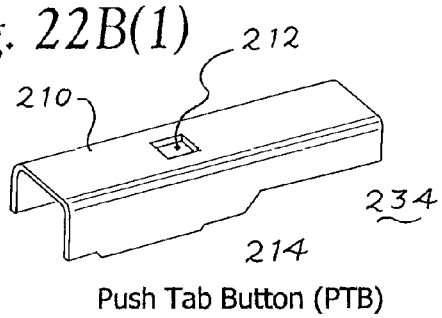
Push Tab Button (PTB)
Fig. 22B(2)
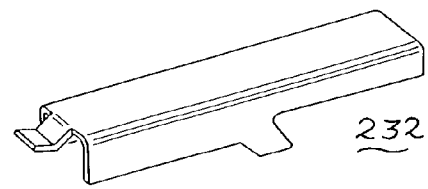
Insert & Lock (I & L)
Fig. 22C(1)
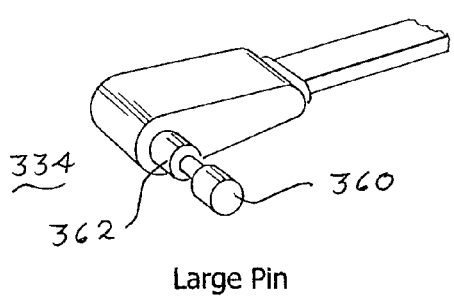
Large Pin
Fig. 22C(2)
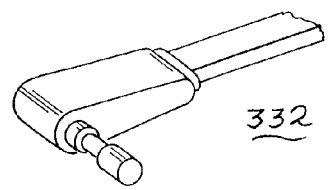
Small Pin

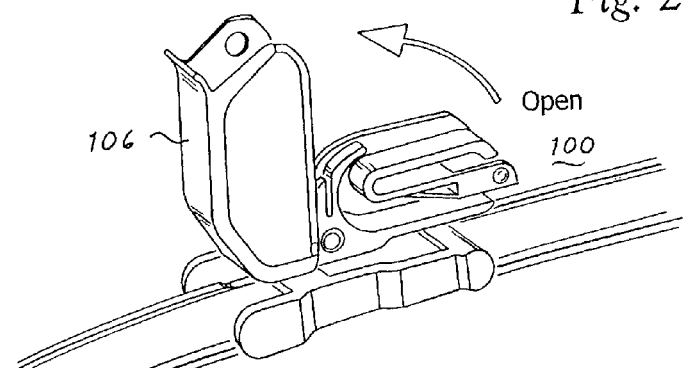
Fig. 23A(1)
Open locking cover on adaptor system
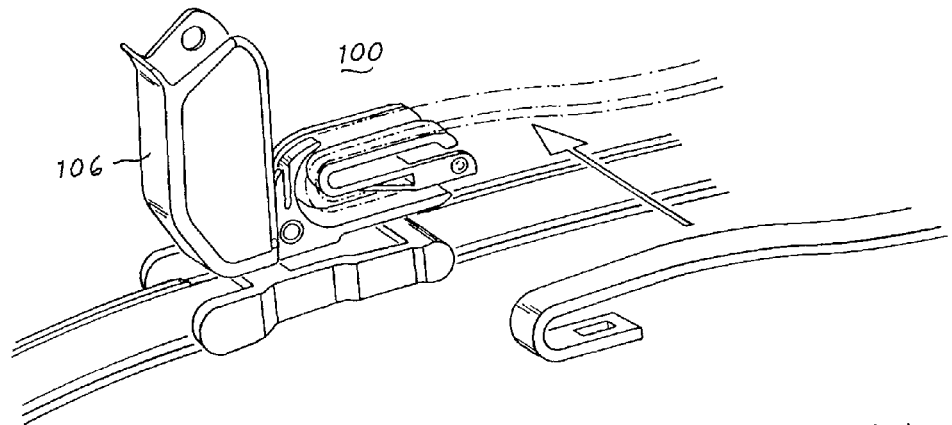
Fig. 23A(2)
Slide J-Hook wiper arm in from side
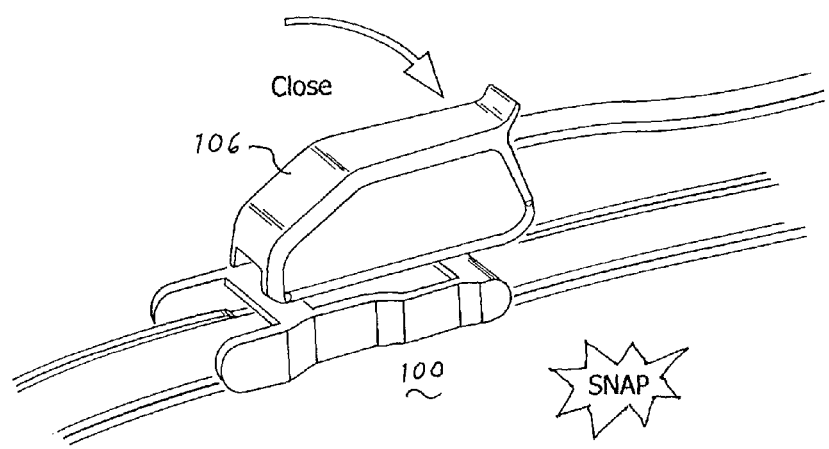
Fig. 23A(3)
Close locking cover until snapped

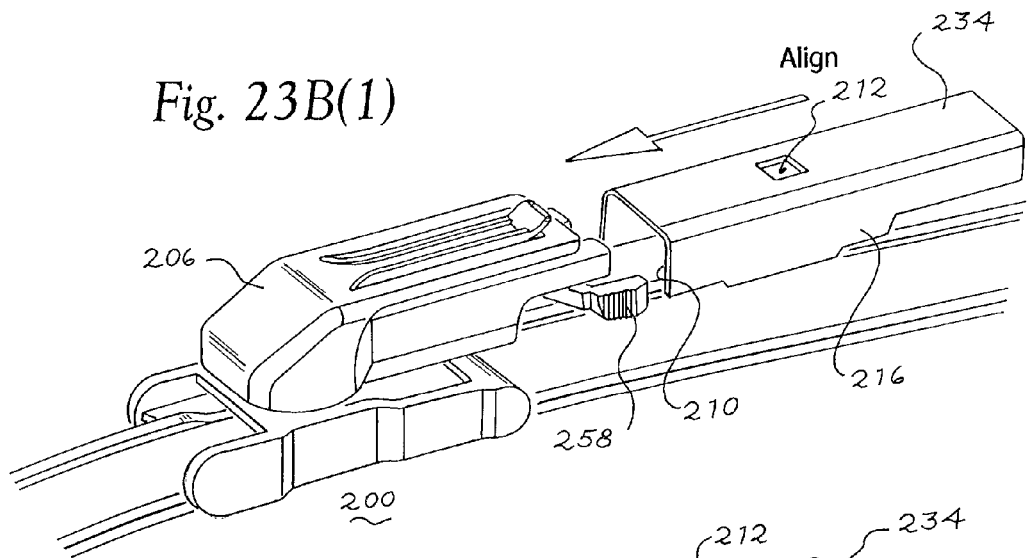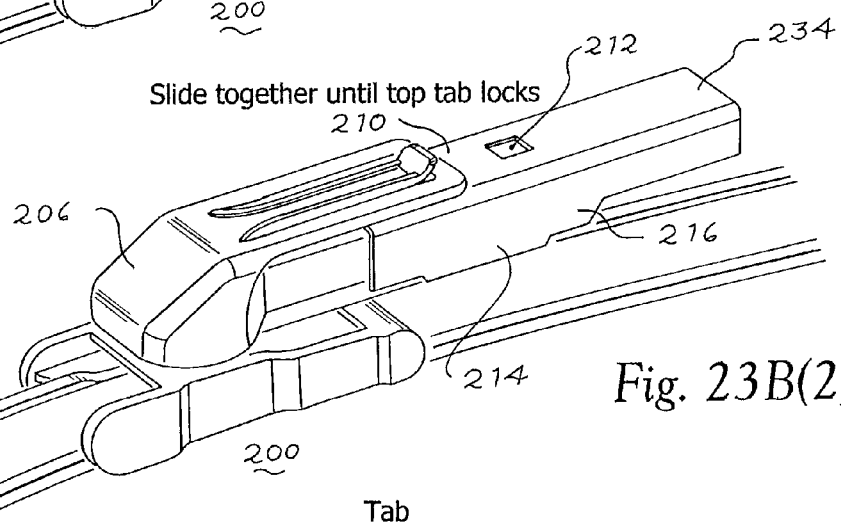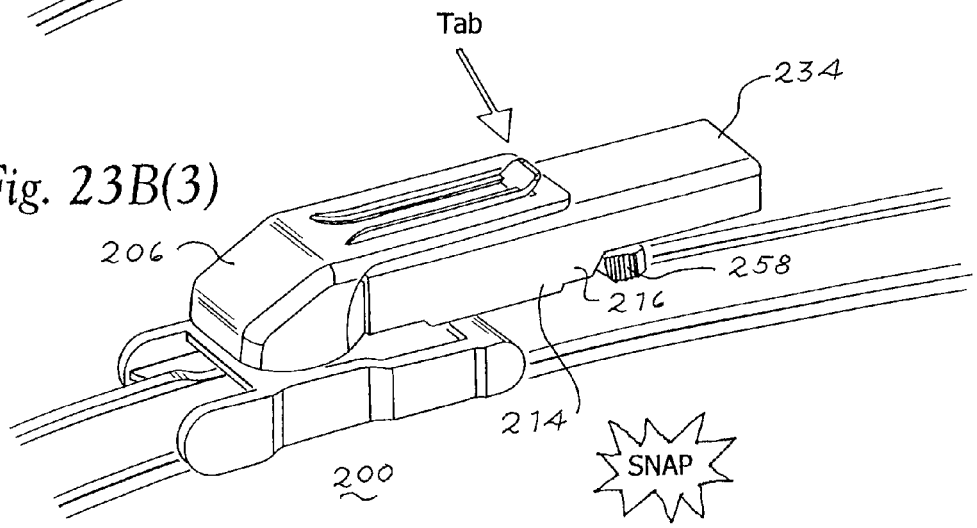

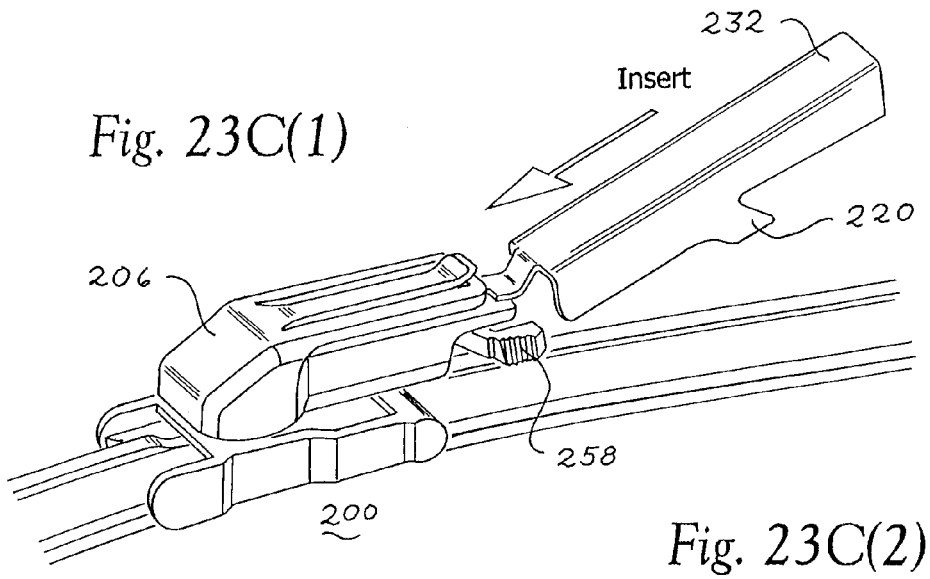
Fig. 23C(1)
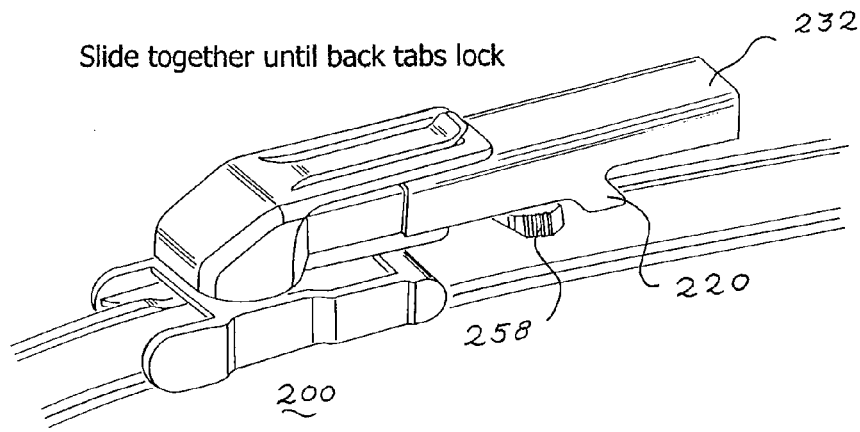
Fig. 23C(2)
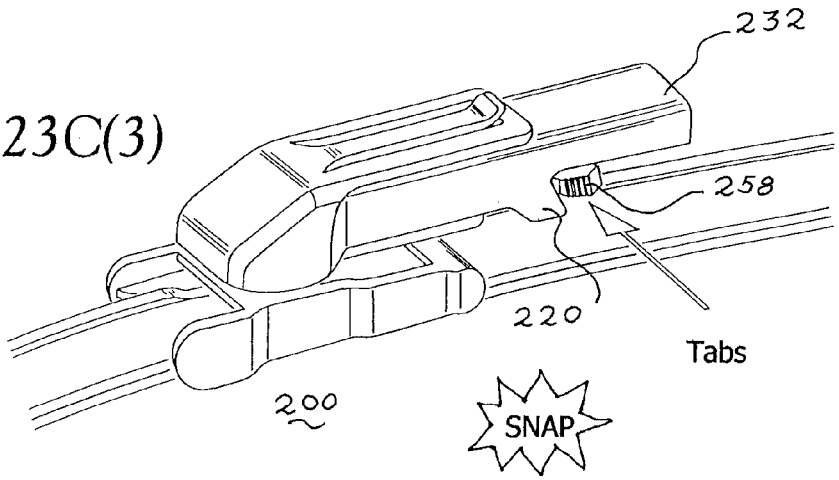
Fig. 23C(3)

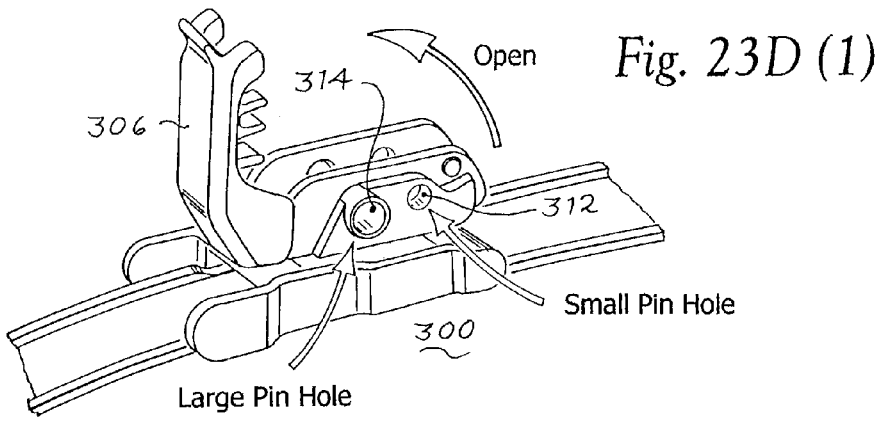
Fig. 23D (1)
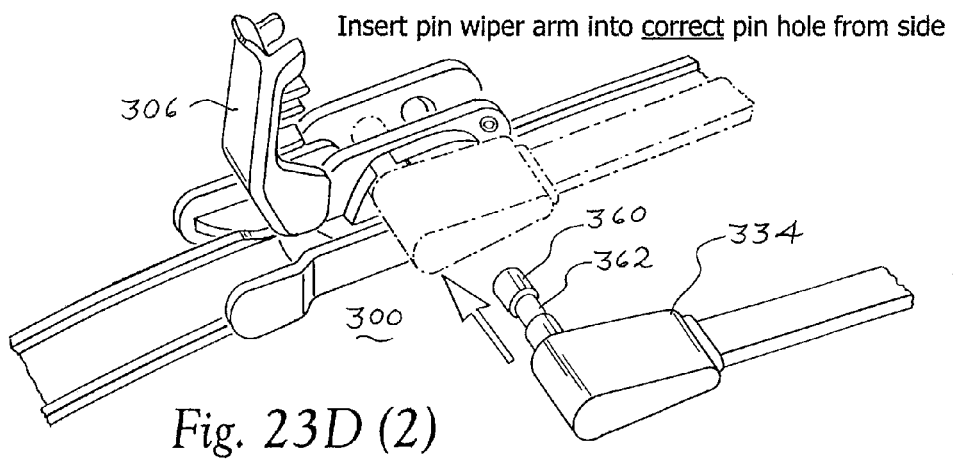
Fig. 23D (2)
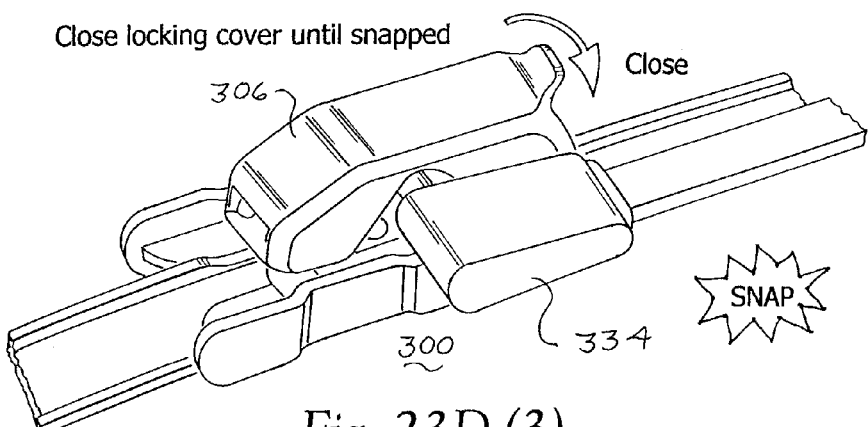
Fig. 23D (3)

CONNECTORS AND CONNECTOR KIT FOR ATTACHMENT OF A WINDSHIELD WIPER BLADE TO MULTIPLE TYPES OF WINDSHIELD WIPER ARMS

BACKGROUND

1. Technical Field

The present invention relates to a connector for attachment of a windshield wiper blade with multiple types of windshield wiper arms. The present invention also relates to a kit that includes the above mentioned connector.

2. Background Information

Automobiles use a variety of wiper arms to move a wiper blade. Since wiper blades need to be replaced periodically, a potential buyer of a wiper blade often has difficulty in identifying a wiper blade displayed in a store that can be attached to the wiper arm or his or her automobile. In the past, this situation was addressed by supplying multiple connectors in either separate packages or with the wiper blade itself so that the consumer could match the appropriate connector with the wiper arm of the consumer's automobile. Often it is hard for the consumer to easily ascertain which connector is to be attached to the wiper arm in question. Furthermore, the connectors often come as multiple pieces which can be easy to lose. In addition, there may be situations where the connectors purchased are not appropriate for attachment to the consumer's wiper arm.

BRIEF SUMMARY OF THE INVENTION

One aspect of the present invention regards a kit for connecting a wiper blade and multiple types of wiper arms, the kit including a container and a set of connectors located within an interior of the container. The set of connectors includes a first connector having a structure to receive and be connected to at least two different wiper arms that are part of a first class of wiper arms. The set of connectors includes a second connector having a structure to receive and be connected to at least two different wiper arms that are part of a second class of wiper arms. The set of connectors includes a third connector having a structure to receive and be connected to at least two different wiper arms that are part of a third class of wiper arms, wherein the first class, the second class and the third class are different from one another.

A second aspect of the present invention regards a connector for connecting a wiper blade and a wiper arm, the connector including a base for attachment to a wiper blade and a receiving element attached to the base. The receiving element having a structure to define the following: a first channel extending along a longitudinal axis of the receiving element and a second channel extending along the longitudinal axis, the second channel being parallel to the first channel. In addition, the first channel and the second channel are simultaneously visible as viewed along a direction perpendicular to the longitudinal axis.

A third aspect of the present invention regards a windshield wiper that includes a wiper blade, a wiper arm and a connector. The connector includes a base attached to the wiper blade and a receiving element attached to the base. The receiving element having a structure to define the following: a first channel extending along a longitudinal axis of the receiving element and a second channel extending along the longitudinal axis, the second channel being parallel to the first channel, wherein the wiper arm is snugly received in the first channel and said second channel. In addition, prior to the wiper arm being snugly received in the first channel and the second channel, the first channel and the second channel are simultaneously visible as viewed along a direction perpendicular to the longitudinal axis.

A fourth aspect of the present invention regards a connector for connecting a wiper blade and a wiper arm, the connector including a base for attachment to a wiper blade and a receiving element attached to the base. The receiving element has a structure for attachment to only one class of wiper blade, the receiving element including a support surface and an engagement surface spaced from and facing the support surface. The flexible engagement surface and the support surface define a slot dimensioned to snugly receive a surface of a wiper arm. The engagement surface includes a first side support, a second side support that faces the first side support and an engagement tongue. In addition, one end of the engagement tongue is attached to both the first side support and the second side support and an opposite end of the engagement tongue is unattached and has a protrusion that faces the support surface.

A fifth aspect of the present invention regards a kit for connecting a wiper blade and multiple types of wiper arms, the kit including a container and a set of connectors located within an interior of the container. The set of connectors including a first connector having a structure to receive and be connected to at least two different wiper arms that are part of a first class of wiper arms. The set of connectors further including a second connector having a structure to receive and be connected to at least two different wiper arms that are part of a second class of wiper arms and at least two different wiper arms that are part of a third class of wiper arms, wherein the first class, the second class and the third class are different from one another.

A sixth aspect of the present invention regards a connector for connecting a wiper blade and a wiper arm. The connector including a base for attachment to a wiper blade and a receiving element pivotably attached to the base, wherein the receiving element only receives two classes of wiper arms. The receiving element includes an attachment that pivotably couples the receiving element to the base, a recess structured to receive a first wiper arm and a pivot stop that is positioned adjacent to the recess, wherein when the first wiper arm is received by the recess, the pivot stop engages the first wiper arm and prevents the receiving element from pivoting relative to the base. The receiving element further including a support surface having a pair of flexible wing stops that face one another and can be pressed towards one another. The receiving element further including an engagement surface spaced from and facing the support surface, the flexible engagement surface and the support surface define a slot dimensioned to snugly receive a surface of a second wiper arm. The engagement surface includes a first side support, a second side support that faces the first side support and an engagement tongue. One end of the engagement tongue is attached to both the first side support and the second side support and an opposite end of the engagement tongue is unattached and has a protrusion that faces the support surface.

A seventh aspect of the present invention regards a windshield wiper that includes a wiper blade, a wiper arm and a connector attached to the wiper arm. The connector includes a base for attachment to a wiper blade and a receiving element pivotably attached to the base, wherein the receiving element only receives two classes of wiper arms. The receiving element includes an attachment that pivotably couples the receiving element to the base, a recess structured to receive a first wiper arm and a pivot stop that is positioned adjacent to the recess, wherein when the first wiper arm is received by the recess, the pivot stop engages the first wiper arm and prevents the receiving element from pivoting relative to the base. The receiving element further including a support surface having a pair of flexible wing stops that face one another and can be pressed towards one another. The receiving element further including an engagement surface spaced from and facing the support surface, the flexible engagement surface and the support surface define a slot dimensioned to snugly receive a surface of a second wiper arm. The engagement surface includes a first side support, a second side support that faces the first side support and an engagement tongue. One end of the engagement tongue is attached to both the first side support and the second side support and an opposite end of the engagement tongue is unattached and has a protrusion that faces the support surface. One or more aspects of the present invention provide the advantage of providing a kit with multiple connectors, wherein it is easy to determine which connector is to be connected with a particular wiper arm.

One or more aspects of the present invention provide the advantage of providing the possibility of attaching a wiper blade to multiple wiper arms with a connector of a single piece construction.

The accompanying drawings, which are incorporated herein and constitute part of this specification, and, together with the general description given above and the detailed description given below, serve to explain features of the present invention.

BRIEF DESCRIPTION OF THE DRAWING

In the drawings:

FIG. 1C shows an exploded view of the connector of FIG. 1A;

FIG. 1D shows a perspective view of the connector of FIG. 1A when an embodiment of a J-hook wiper arm is received therein;

FIG. 8A shows a perspective view of a second embodiment of a connector for attachment of a windshield wiper blade with multiple types of windshield wiper arms;

FIG. 8B shows an exploded view of the connector of FIG. 8A;

FIG. 16 shows a left side view of the connector of FIG. 15B;

FIG. 17 shows a right side view of the connector of FIG. 15B;

FIG. 18 shows a top view of the connector of FIG. 15B;

FIG. 19 shows a bottom view of the connector of FIG. 15B;

FIG. 20 shows a front view of the connector of FIG. 15B;

FIG. 21 shows a rear view of the connector of FIG. 15B;

FIGS. 22A-C show three classes of wiper arms to be attached to one of the connectors of FIGS. 1-21;

FIGS. 23A-D schematically show processes for attaching the wiper arms of FIGS. 22A-C with the connectors of FIGS. 1-21;

DETAILED DESCRIPTION OF THE PREFERRED EMBODIMENTS

Figure 1A:
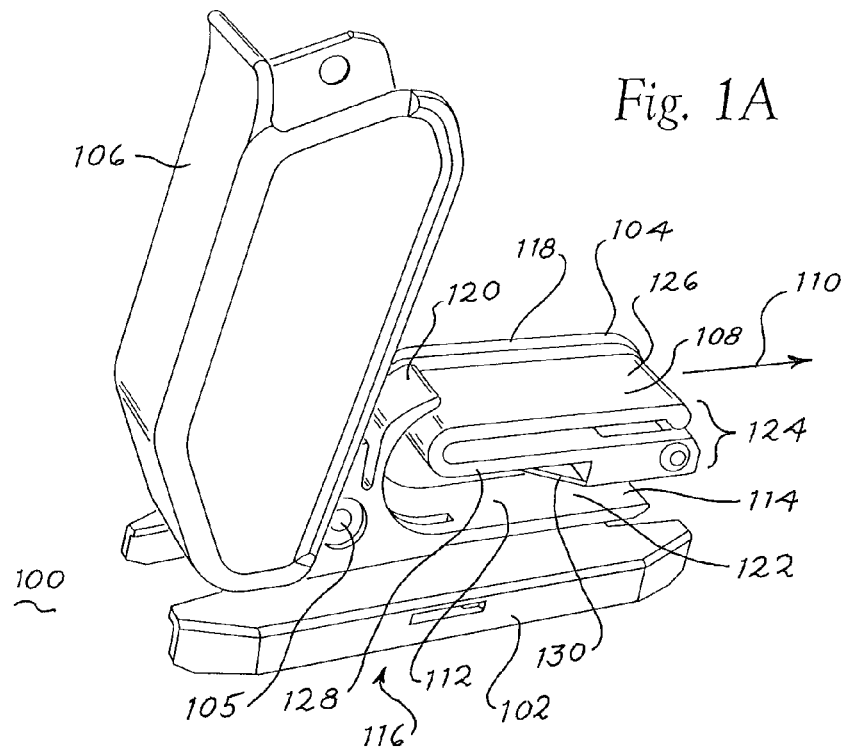
FIG. 1A shows a perspective view of an embodiment of a connector for attachment of a windshield wiper blade with multiple types of windshield wiper arms, wherein the connector is an open position.
Figure 1B:
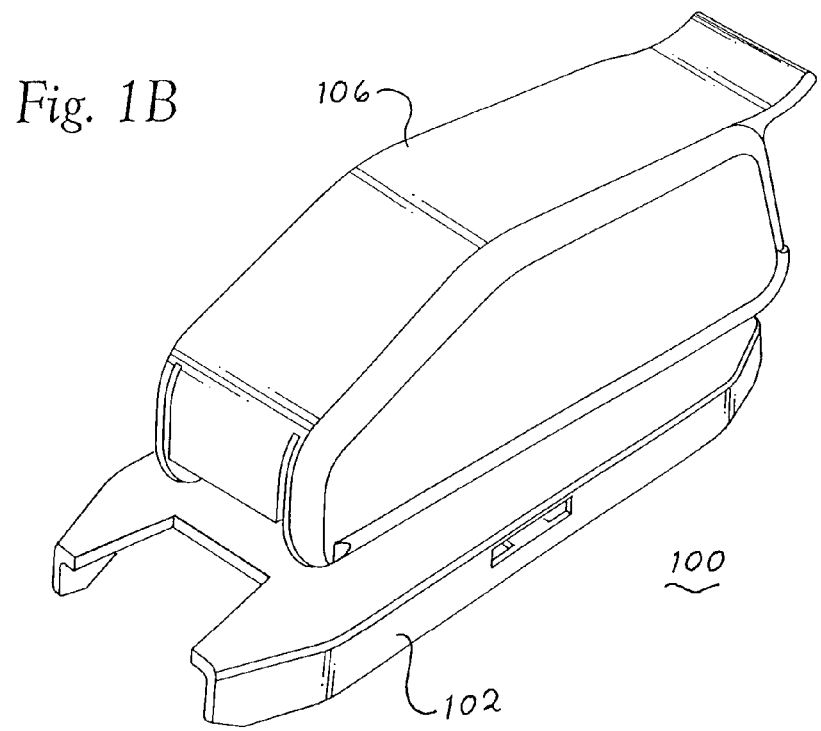
FIG. 1B shows a perspective view of the connector of FIG. 1A in a closed position.
Figure 1E:
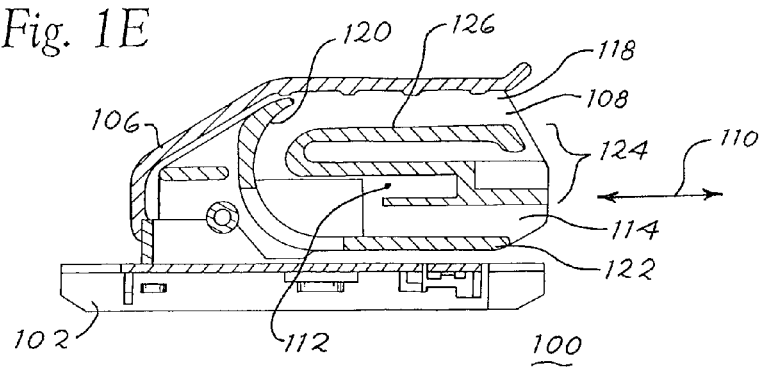
FIG. 1E shows a cross-sectional view of the connector of FIG. 1B.
Figure 2:
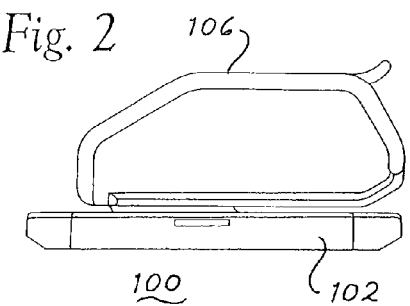
FIG. 2 shows a left side view of the connector of FIG. 1B.
Figure 3:
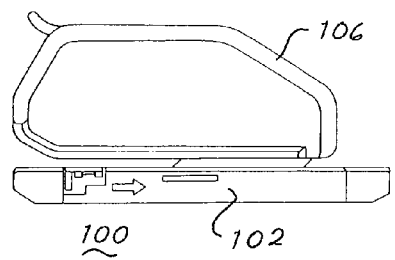
FIG. 3 shows a right side view of the connector of FIG. 1B.
Figure 4:
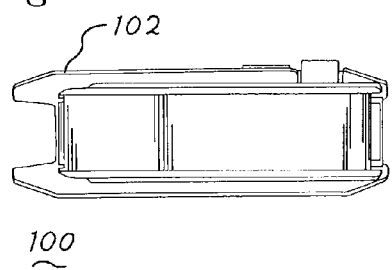
FIG. 4 shows a top view of the connector of FIG. 1B.
Figure 5:
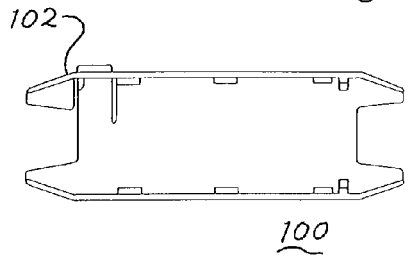
FIG. 5 shows a bottom view of the connector of FIG. 1B.
Figure 6:
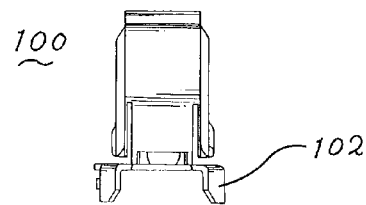
FIG. 6 shows a front view of the connector of FIG. 1B.
Figure 7:
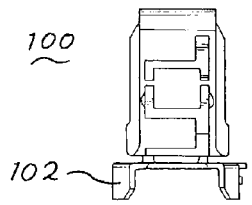
FIG. 7 shows a rear view of the connector of FIG. 1B.

FIGS. 1A-E and 2-7 show a connector 100 for connecting a wiper blade and multiple types of wiper arms. The connector 100 includes a base 102 that is used to attach the connector 100 to a wiper blade. In particular, the underside of the base 102 includes flexible fingers that engage a bracket positioned in the central portion of the wiper blade. An example of a possible wiper blade for the connector 100 to be attached to is the wiper blade sold under the name Latitude and distributed under the Rain-X trademark by ITW Global Brands. Note that the base 102 can be revised so as to allow attachment to other types of wiper blades, such as wiper blades made by ADM21 Co., LTD., Anco, Bosch, Corea Autoparts Producing Corp., KCW Corporation, Proline, Trico and Valeo.

The connector 100 includes a receiving element 104 that is pivotably attached to a top portion of the base 102. In particular, the receiving element 104 has a pair of holes 105 that face opposite one another. The holes 105 receive pins 107 (see FIG. 1C) formed on a central raised portion of the base 102. Thus, the receiving element 102 is able to pivot about the pins.

As will be explained hereafter, the receiving element 104 has a structure to receive and be connected to at least two different wiper arms, which are defined to be in only one class of wiper arms. In particular, the receiving element 104 has a structure for attachment to two portions of J-hook wiper arms 132 and 134 as shown in FIGS. 22A(1)-(2). As shown in FIGS. 22A(1)-(2), the J-hook wiper arms 132 and 134 are of different sizes. For attachment to be accomplished, a locking cap or cover 106 is pivoted to an open position as shown in FIG. 1A. Pivoting of the locking cap 106 is accomplished by a pair of openings (not shown) that face opposite one another at a lower end of the locking cap 106. Pins 107 formed at a front lower portion of the receiving element 104 are inserted into the openings of the locking cap 106 mentioned previously. Thus, the locking cap 106 pivots about an axis aligned with the pins from the open position shown in FIG. 1A to a closed position shown in FIG. 1B.

With the locking cap 106 in the open position, a J-hook wiper arm can be attached to the connector 100 via receiving element 104. In the case of attaching the smaller J-hook wiper 132 to the receiving element 104, the receiving element 104 has a structure to define the following: 1) a first channel 108 extending along a longitudinal axis 110 of the receiving element; 2) a second channel 112 extending along the longitudinal axis 110; and 3) a third channel 114 extending along the longitudinal axis 110. As shown in FIG. 1A, the first channel 108 is parallel to each of the second channel 112 and third channel 114. In addition, when the locking cap 106 is fully pivoted to the open position, each of the channels 108, 112 and 114 can be viewed simultaneously by a user when viewing along a direction 116 perpendicular to the longitudinal axis 110. When the locking cap 106 is pivoted to the closed position shown in FIG. 1B, channels 108, 112 and 114 are not visible to the user.

As shown in FIGS. 1A and 1C, the receiving element 104 includes a side wall 118 and a curved end wall 120 attached to the side wall 118 and extending in the direction 116. The receiving element 104 includes a bottom wall 122 attached to the end wall 120 and the side wall 118. In addition, the receiving element 104 has a partition 124 attached to the side wall 118. The side wall 118, end wall 120, bottom wall 122 and the partition 124 define at least in part the first channel 108, second channel 112 and third channel 114. In the case of the partition 124, it includes a first side 126, a second side 128 and a third side 130 that extend from the side wall 118 in direction 116. As shown in FIGS. 1A and 1C, the first side 126 and the side wall 118 define at least in part the first channel 108. Furthermore, the second side 128, the third side 130, the side wall 118 and the end wall 120 define at least in part the second channel 112. Similarly, the third side 130, the side wall 118, the end wall 120 and the bottom wall 122 define the third channel 114. As shown in FIGS. 1A and 1C, the structure of the receiving element 104 is such that each of the first channel 108, second channel 112 and third channel 114 has a width of a standard J-hook wiper arm, such as approximately 1 cm, as measured in direction 116.

Attachment of the small J-hook wiper arm 132 to the connector 100 is accomplished by first pivoting the locking cap 106 to an open position as shown in FIG. 23A(1). At this position, the first channel 108 and the second channel 112 are visibly exposed. The small J-hook wiper arm 132 is slid into the side of the connector 100 by placing the longer portion of the wiper arm 132 fully into the first channel 108 and sliding the curved and shorter portions of the wiper arm 132 fully into the second channel 112 as shown in FIG. 23A(2). At this stage, the locking cap 106 is pivoted downwards so that indents in the locking cover 106 engage locking protrusions formed in the receiving element 106. The snapping of the locking cap 106 into the closed position alerts the user that the J-hook wiper arm 132 is locked into position.

Attachment of a large J-hook wiper arm 134 to the connector 100 is accomplished in a manner similar to that as explained previously for the small J-hook wiper arm 132. In particular, the locking cap 106 is pivoted to an open position as shown in FIG. 23A(1). At this position, the first channel 108 and the third channel 114 are visibly exposed. The large J-hook wiper arm 134 is slid into the side of the connector 100 by placing the longer portion of the wiper arm 134 fully into the first channel 108 and sliding the curved and shorter portions of the wiper arm 134 fully into the third channel 114 as shown in FIG. 23A(2). At this stage, the locking cap 106 is pivoted downwards so that indents in the locking cap 106 engage locking protrusions formed in the receiving element 104. The snapping of the locking cap 106 into the closed position alerts the user that the J-hook wiper arm 134 is locked into position.

Due to the differences in sizes of the J-hook wiper arms 132, 134 and variations of the sizes of different J-hook wiper arms in general, the receiving element 104 includes several compensation structures. For example, one compensation structure is the end wall 120 that moves generally along the longitudinal direction toward the locking cap 106, which allows for accommodation for the larger size of the wiper arm 134. Another compensation structure regards the sides 126 and 128 of the partition 124, which act as a spring that allows for the insertion of various sizes of J-hook wiper arms. Note that the compensation structures described above also promote a snug fit between the receiving element 104 and the J-hook wiper arms.

FIGS. 8A-C, 9-14 and 14A-C show a connector 200 for connecting a wiper blade and multiple types of wiper arms. The connector 200 includes a base 202 that is used to attach the connector 200 to a wiper blade. In particular, the underside of the base 202 includes flexible fingers that engage a bracket positioned in the central portion of the wiper blade. An example of a possible wiper blade for the connector 200 to be attached to is the wiper blade sold under the name Latitude and distributed under the Rain-X trademark by ITW Global Brands. Note that the base 202 can be revised so as to allow attachment to other types of wiper blades, such as wiper blades made by ADM21 Co., LTD., Anco, Bosch, Corea Autoparts Producing Corp., KCW Corporation, Proline, Trico and Valeo.

The connector 200 includes a receiving element 204 that is pivotably attached to a top portion of the base 202. In particular, the receiving element 204 has a pair of holes 205 (see transparent view of FIG. 8C) that face opposite one another. The holes 205 receive pins 207 (see FIGS. 8B-C) formed on a central raised portion of the base 202. Thus, the receiving element 202 is able to pivot about the pins 207.

As will be explained hereafter, the receiving element 204 has a structure to receive and be connected to at least two different channel-type wiper arms, which are defined in only one class of wiper arms—single channel wiper arms. Examples of such single channel wiper arms are a Push Tab Button (PTB) wiper arm and an Insert & Lock (I & L) wiper arm. With the above said, the receiving element 204 has a structure for attachment to two portions of either a PTB wiper arm 234 (see FIG. 22B(1)) or an I & L wiper arm 232 (see FIG. 22B(2)).

In the case of the PTB wiper arm 234, the entire wiper arm 234 is aligned with a slot 240 (see FIGS. 8A and 23B(1)) that is defined by the space between a support surface 242 of the receiving element 204 and an engagement surface 244 that is spaced apart from and facing the support surface 242. The slot 240 is dimensioned to snugly receive a top surface 210 of the aligned distal end of the PTB wiper arm 234 that is inserted into the slot 240 as shown in FIGS. 8A and 23B(2). As shown in FIG. 8A, the engagement surface 244 includes a first side support 246 and a second side support 248 that faces the first side support 246. The engagement surface 244 further includes an engagement tongue 250, wherein one end 252 of the engagement tongue 250 is attached to both side supports 246, 248 and an opposite end 254 of the engagement tongue 250 is unattached and has a protrusion 255 on the bottom surface of the engagement tongue 250 that faces the support surface 242. The first side support 246 and the second side support 248 move independently of the engagement tongue 250 and vice versa.

Figure 14:
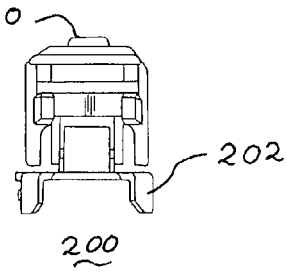
FIG. 14 shows a rear view of the connector of FIG. 8A.
Figure 14A:
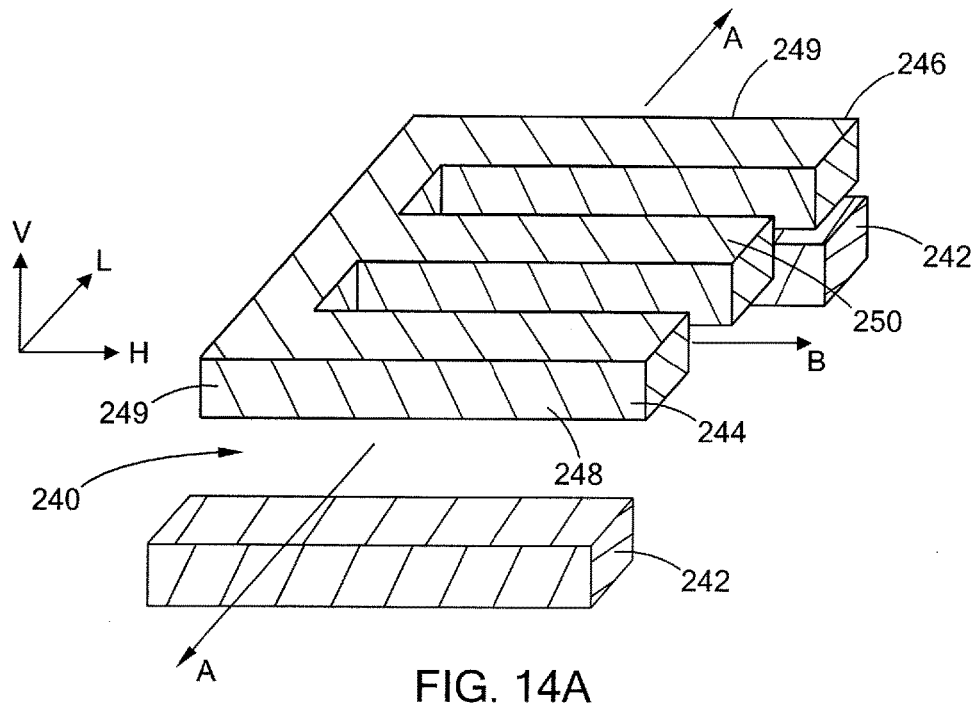
FIG. 14A schematically shows an enlarged schematic and perspective view of a portion of the slot formed in the connector of FIGS. 8A-C and 9-14.
Figure 14B:
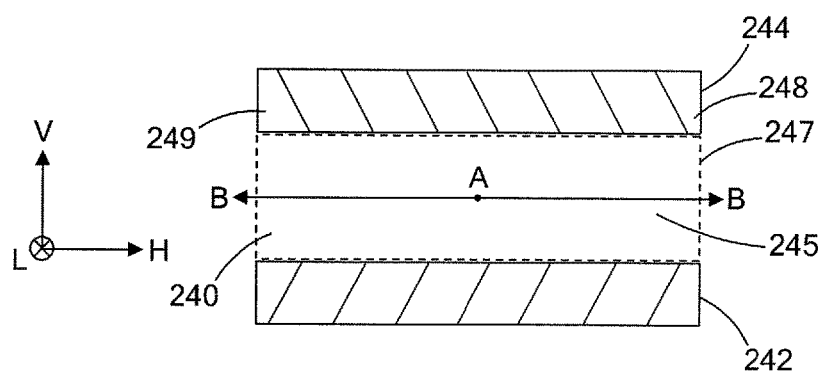
FIG. 14B shows a side view of the portion of the slot of FIG. 14A.
Figure 14C:
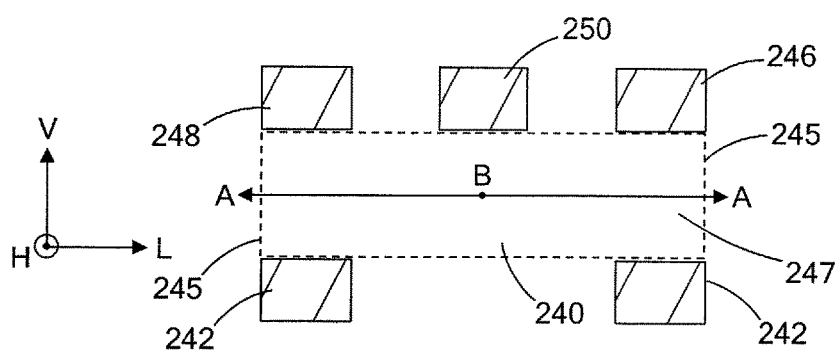
FIG. 14C shows a rear view of the portion of the slot of FIG. 14A.

FIG. 14A shows an enlarged, schematic view of the receiving element 204, wherein at a right side of the figure a cross-sectional view is shown as defined by an imaginary vertical plane that intersects rear portions of the engagement surface 244 and the support surface 242. As shown in FIGS. 14A-C, the slot 240 is positioned between the support surface 242 and the engagement surface 244, wherein the engagement surface 244 is spaced from and faces the support surface 242 as viewed along a vertical direction V. The engagement surface 244 is substantially parallel to the support surface 242 along an entire length of the engagement surface 244. The vertical direction V is the same direction at which the receiving element 204 is arranged above the base 202. The slot 240 extends along a length of the engagement surface 244 as viewed along a horizontal direction H that is perpendicular to the vertical direction V. In addition, the slot 240 includes a side opening 245 defined by the support surface 242 and the engagement surface 244, wherein the side opening 245 (see dashed lines in FIG. 14B) is unencumbered by any portion of the receiving element 204 when an axis A, which has no end points and is parallel to a lateral direction L that is perpendicular to both the vertical direction V and the horizontal direction H, passes through the side opening 245 and does not intersect the receiving element 204 in any way. Furthermore, the slot 240 has a rear opening 247 (see dashed lines in FIG. 14C) that is defined by side supports 246, 248, engagement tongue 250, and support surface 242. Note that in FIGS. 14B-C, a dot indicates an axis coming out of the page and a circle with an "x" inside indicates an axis going into the page. The opening 247 is intersected by an axis B that is perpendicular to the opening 247 and intersects with and is perpendicular to axis A. From axis A, axis B extends through the rear portion of the slot 240 (see FIG. 14A) without intersecting the receiving element 204 in any way. Thus, the slot 240 defines left and right side openings 245 and a rear opening 247 for the receiving element 204.

Once the top surface 210 of the PTB wiper arm 234 is inserted into the slot 240, the PTB wiper arm 234 is pushed further into the slot 240 toward the front end 206 of the receiving element 204 until the protrusion on the bottom surface of the engagement tongue 250 snaps into a rectangular opening 212 of the top surface 210 of the PTB wiper arm 234. When the snapping sound of insertion of the protrusion 255 through the opening 212 is heard, it signals that the PTB wiper arm 234 is attached to the connector 200. Note that during insertion of the PTB wiper arm 234, side flanges 214 of the arm 234 engage lower edges 256 of the support surface 242 of the receiving element 204. As shown in FIGS. 22B(1) and 23B(1)-(3), the PTB wiper arm 234 has a U-type cross-section as defined by a top surface 210 and side flanges 214. When the wiper arm 234 is attached to the connector 200 by insertion of the top surface 210 into the rear opening 277, an upper face of the top surface 210 of the wiper arm 234 faces the undersides of the engagement surface 244 and the engagement tongue 250. In addition, a lower face of the top surface 210 that is opposite to the upper face faces a top face of the support surface 242. Furthermore, upon attachment, the side flanges 214, which are substantially parallel to each other and are connected to and arranged on either side of the top surface 210 so as to be substantially perpendicular to the top surface 210, face exterior sides 249 of the side supports 246 and 248 of the engagement surface 244. In addition, at the locked position, shoulders 216 of the PTB wiper arm 234 are trapped from going significantly in a direction away from the front end 206 by a pair of flexible wing stops 258 that face one another. The flexible wing stops 258 can be pressed towards one another along a direction that is perpendicular to a longitudinal axis of the slot 240.

Removal of the PTB wiper arm 234 that is locked in position is accomplished by pivoting upward a release notch 260 on the top surface of the engagement tongue 250. Such pivoting causes the protrusion 255 on the bottom surface of the engagement tongue 250 to be removed from the opening 212 and so the PTB wiper arm 234 can be pulled out of the slot 240 once the flexible wing stops 158 are pressed towards one another.

Figure 8C:
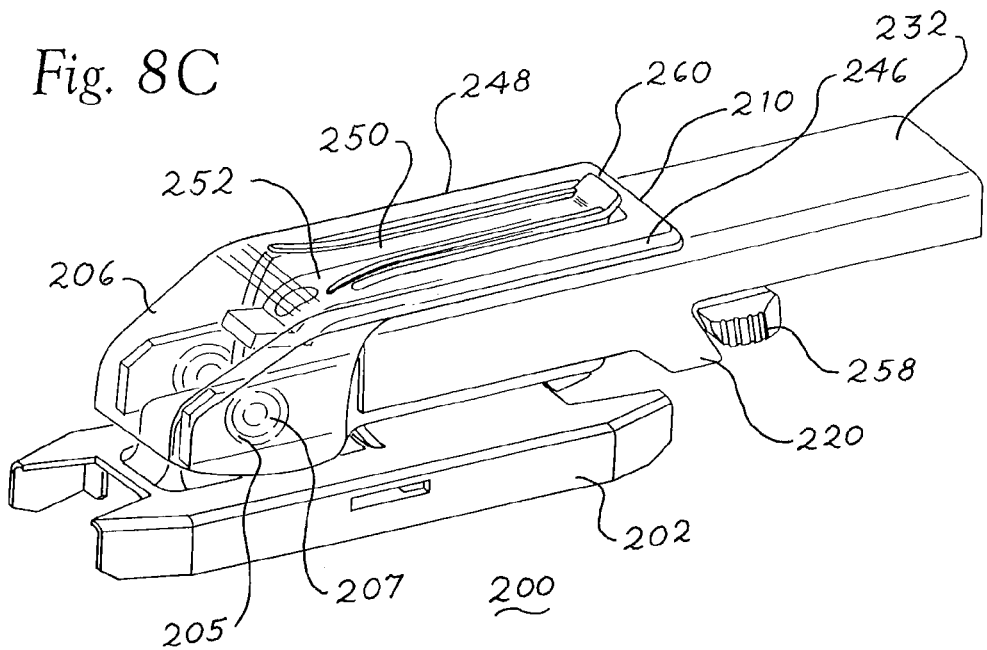
FIG. 8C shows a perspective view of the connector of FIG. 8A when an I & L wiper arm is received therein.

As shown in FIGS. 8C and 23C, attachment of an I & L wiper arm 232 to the connector 200 is accomplished by first angling and aligning the distal end of the wiper arm 232 so that it will be inserted into the slot 240 and a channel defined between the side walls of the support surface 242. Such angling is needed so that a front edge of curved portion of the I & L wiper arm 232 can be freely inserted into the slot 240. Note that the slot 240 and the channel abut one another and are in fluid communication with one another with the channel being positioned nearer front end 206 of the connector 200 than the slot 240. Once the curved portion is inserted into the slot 240, the I & L wiper arm 232 is pivoted downward and the top surface of the I & L wiper arm 232 is pushed into the slot 240 toward the front end 206 as shown in FIG. 23C(2). Pushing of the wiper arm 232 is continued until shoulders 220 ride over the top surfaces of the wing stops 258 and the shoulders 220 pass the wing stops 258. As shown in FIGS. 8C and 23C((3), at this point the wing stops 258 snap behind the shoulders 220 thus preventing the I & L wiper arm 232 from being moved out of the slot 240. At this point also, the curved portion enters the channel and engages a shoulder that has a shape complementary to the shape of the curved portion. When the snapping sound of insertion of the wing stops 258 is heard, it signals that the I & L wiper arm 232 is attached to the connector 200.

Removal of the I & L wiper arm 232 that is locked in position is accomplished by squeezing the wing stops 258 towards each other so as to allow the shoulders 220 to move past the wing stops 258 and away from the front end 206. With this configuration, the I & L wiper arm 232 can be removed from the slot 240.

FIGS. 15A-D and 16-21 show a connector 300 for connecting a wiper blade and multiple types of wiper arms. The connector 300 includes a base 302 that is used to attach the connector 300 to a wiper blade. In particular, the underside of the base 302 includes flexible fingers that engage a bracket positioned in the central portion of the wiper blade. An example of a possible wiper blade for the connector 300 to be attached to is the wiper blade sold under the name Latitude and distributed under the Rain-X trademark by ITW Global Brands. Note that the base 102 can be revised so as to allow attachment to other types of wiper blades, such as wiper blades made by ADM21 Co., LTD., Anco, Bosch, Corea Autoparts Producing Corp., KCW Corporation, Proline, Trico and Valeo.

The connector 300 includes a receiving element 304 that is attached to a top portion of the base 302 in such a manner that the receiving element 304 is not pivotable relative to the base 302. In particular, the receiving element 304 has a pair of holes 305 that face opposite one another. The holes 305 receive pins 307 formed on a central raised portion of the base 302. Note that the side walls 308 and 310 of the receiving element 304 extend downward to such an extent that the bottoms of the side walls almost contact the top surface of the base 302. Such proximity between the bottoms of the side walls 308 and the top surface of the base 302 essentially prevents the receiving element 304 from pivoting relative to the base 302. Note that in an alternative embodiment, the base 302 and receiving element 304 may be integrally attached to one another.

Figure 15A:
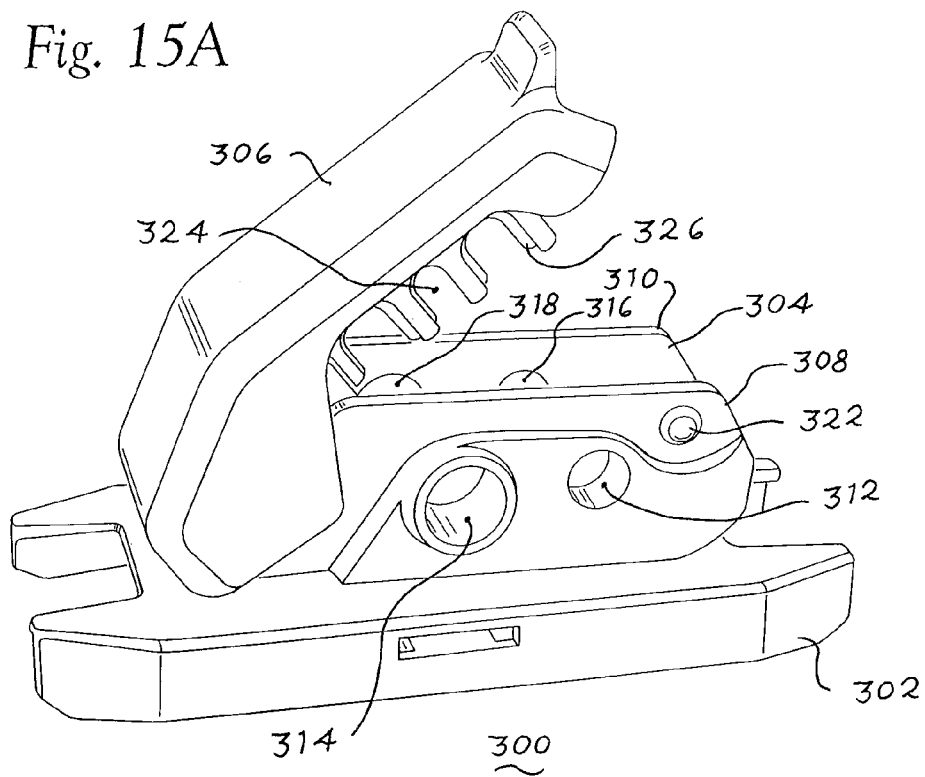
FIG. 15A shows a perspective view of a third embodiment of a connector for attachment of a windshield wiper blade with multiple types of windshield wiper arms, wherein the connector is an open position.
Figure 15B:
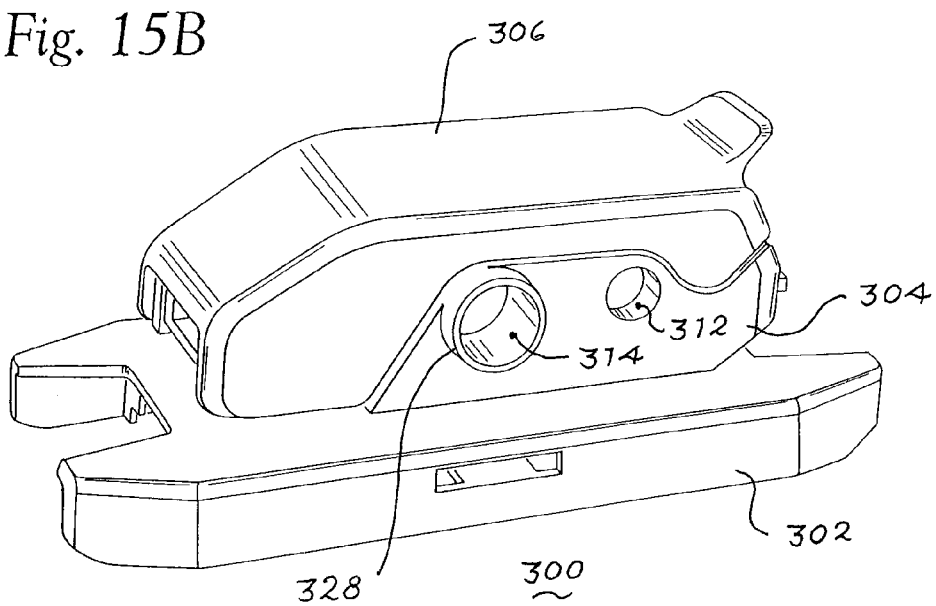
FIG. 15B shows a perspective view of the connector of FIG. 15A in a closed position.
Figure 15C:
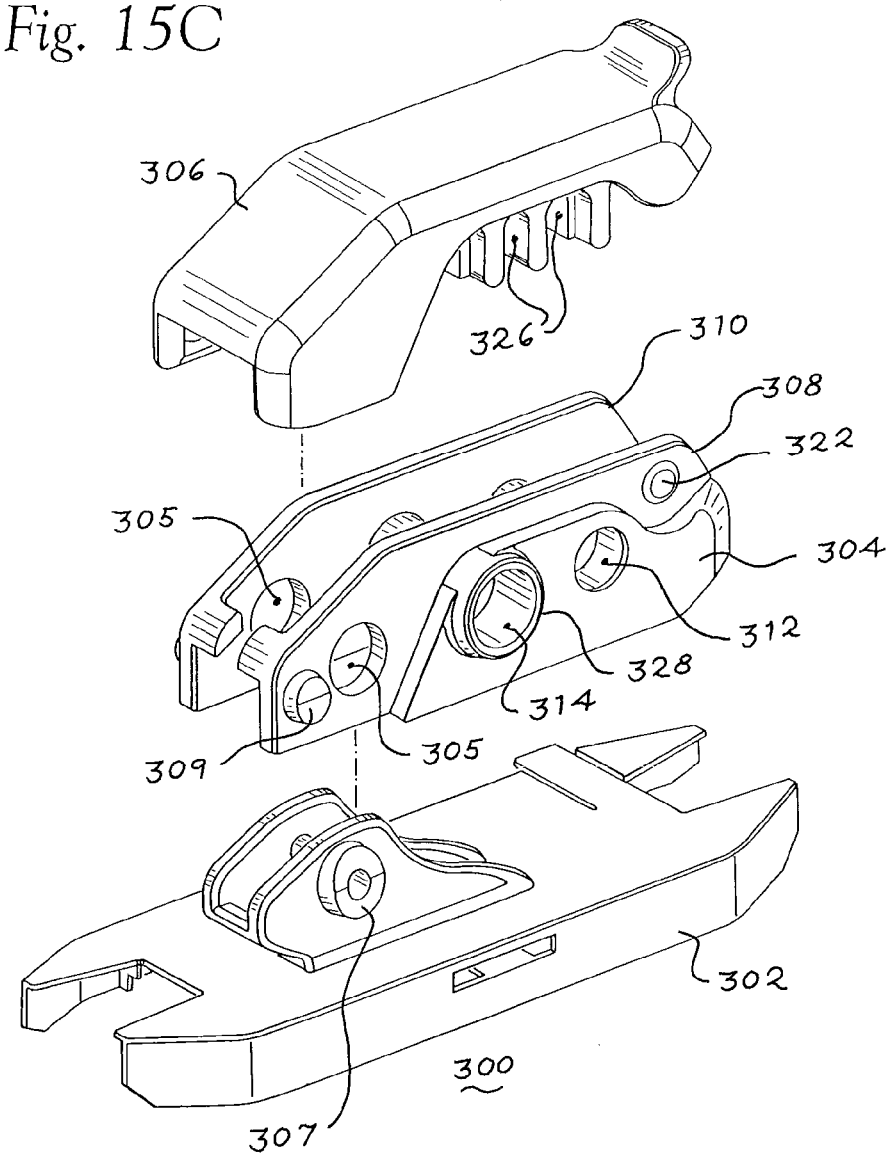
FIG. 15C shows an exploded view of the connector of FIG. 15A.
Figure 15D:
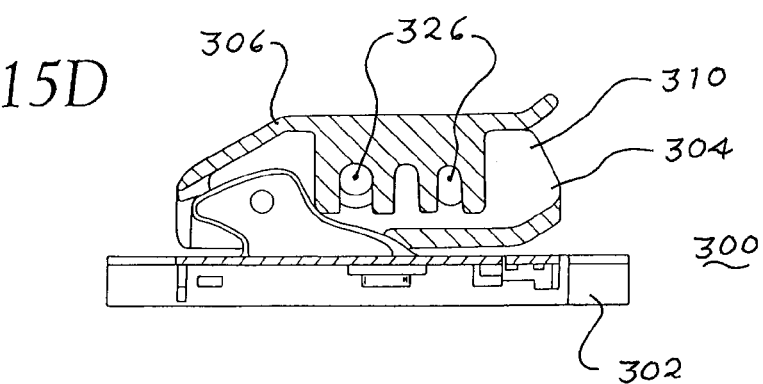
FIG. 15D shows a cross-sectional view of the connector of FIG. 15B.

As will be explained hereafter, the receiving element 304 has a structure to receive and be connected to at least two different pin wiper arms, which are defined in only one class of wiper arms. In particular, the receiving element 304 has a structure for attachment to two portions of pin wiper arms 332 and 334 as shown in FIG. 22C(1)-(2). As shown in FIGS. 22A(1)-(2), the pin wiper arms 332 and 334 are of different sizes. For attachment to be accomplished, a locking cap or cover 306 is pivoted to an open position as shown in FIG. 15A. Pivoting of the locking cap 306 is accomplished by a pair of openings (not shown) that face opposite one another at a lower end of the locking cap 306. Pins 309 formed at front lower portions of the opposing side walls 308 and 310 of the receiving element 304 are inserted into the openings of the locking cap 306 mentioned previously. Thus, the locking cap 306 pivots about an axis aligned with the pins from the open position shown in FIG. 15A to a closed position shown in FIG. 15B.

With the locking cap 306 in the open position, a pin wiper arm can be attached to the connector 300 via receiving element 304. In the case of attaching the smaller pin wiper arm 332 to the receiving element 304, the receiving element 304 includes a pair of recesses or openings 312 and 314 in side wall 308 and oppositely facing and identically sized recesses or openings 316 and 318 formed in the side wall 310. The recesses 312 and 316 have a diameter so as to correspond to the diameter of the distal portion of a small pin wiper arm 332. Similarly, the recesses 314 and 318 have a diameter so as to correspond to the diameter of the distal portion of a large pin wiper arm 334.

Attachment of either the large pin wiper arm 334 or the small pin wiper arm 332 is accomplished in a similar manner. In the case of attachment of the large pin wiper arm 334, the distal end 360 is aligned with the recess 314 as shown in FIG. 23D(2). Next, the distal end 360 is inserted through the recess 314 until the distal end 360 is received within recess 318 and extends slightly past the exterior of side wall 310. At this position, the locking cap 306 is pivoted to the closed position of FIG. 15B, wherein side indents (not shown) of the locking cap 306 engage side protrusions 322 formed in the side walls 308 and 310. Engagement in the indents by the side protrusions 322 causes a snapping sound as shown in FIG. 23D(3), which signals that the pin wiper arm is locked into attachment with the connector 300. Note that in the closed position, a c-shaped indent or surface 324 engages the middle portion 362 of the pin wiper arm 334 and presses the pin in general against the edges of the recesses 314 and 318. The c-shaped indent or surface 324 preferably has a shape that corresponds to the shape of the middle portion 362. Similarly, when the small pin wiper arm 332 is attached via insertion through recesses 312, 316, a smaller c-shaped surface 326 engages a middle portion of the pin wiper arm 332 when locking cap 306 is closed. Removal of the pin wiper arm 332, 334 is accomplished by moving the locking cap 306 to the open position of FIG. 15A and pulling the distal end of the pin wiper arm 332, 334 through the corresponding recesses 314, 318 and 312, 316.

Figure 24:
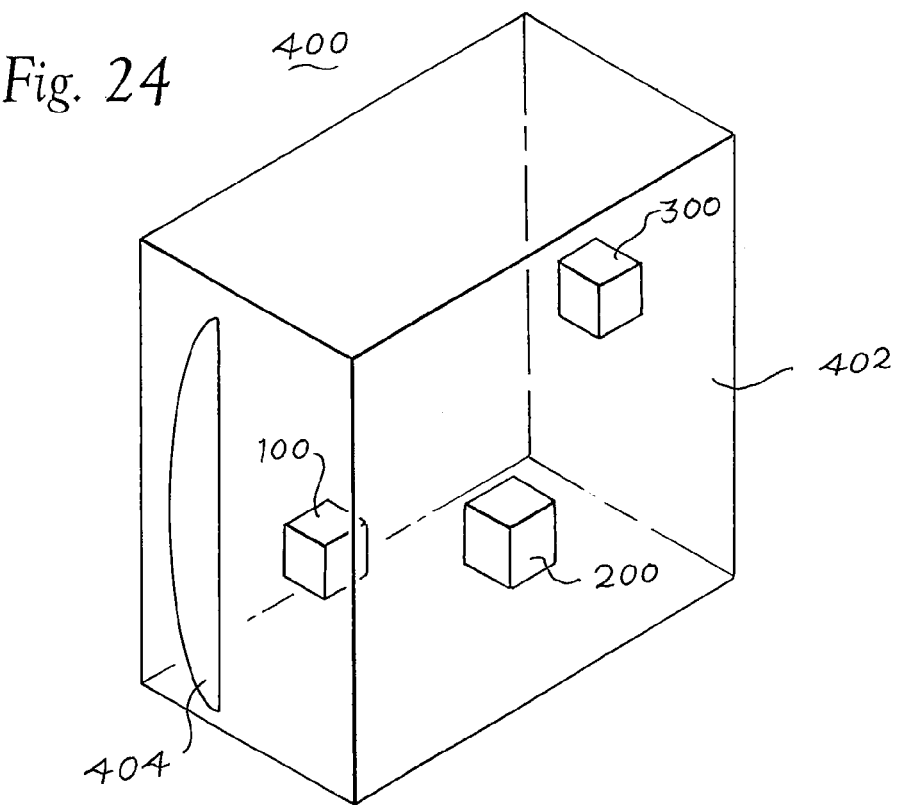
FIG. 24 schematically shows a kit that includes one or more of the connectors of FIGS. 1-21 and 25-31.
Figure 9:
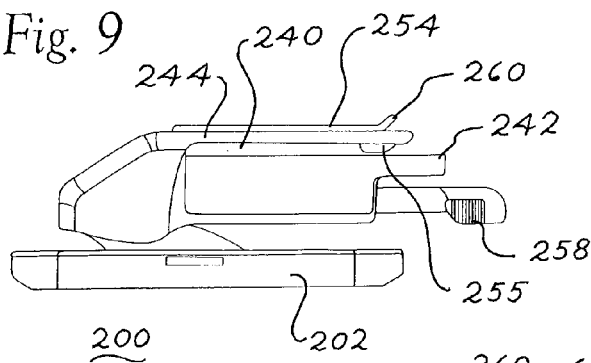
FIG. 9 shows a left side view of the connector of FIG. 8A.
Figure 10:
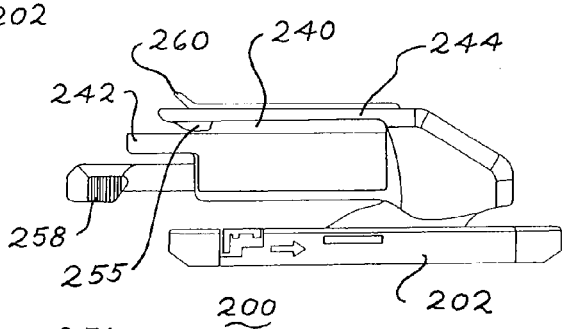
FIG. 10 shows a right side view of the connector of FIG. 8A.
Figure 11:
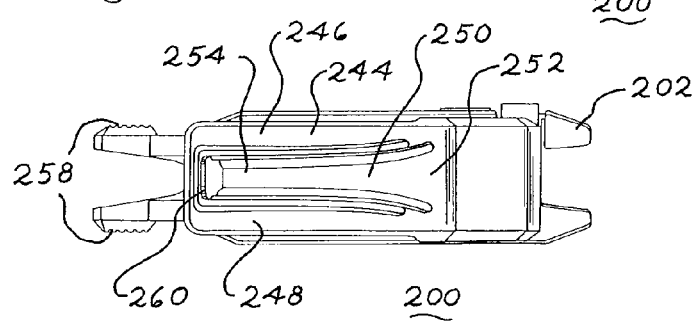
FIG. 11 shows a top view of the connector of FIG. 8A.
Figure 12:
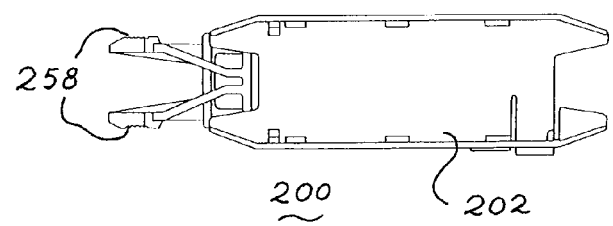
FIG. 12 shows a bottom view of the connector of FIG. 8A.
Figure 13:
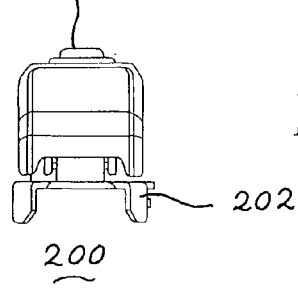
FIG. 13 shows a front view of the connector of FIG. 8A.

Note that the distal ends of the pin wiper arms 332, 334 can be first inserted through the recesses of side wall 308 or the recesses of the other side wall 310. With that said, the receiving element 304 includes c-shaped collars 328 that extend away from the recesses 314, 318 and side walls 308, 310 so as to prevent the distal end 360 of the large pin wiper arm 334 from extending too much past the recesses 314, 318 and exterior of side walls 308, 310 when fully inserted into the receiving element 304. With the above described connectors 100, 200 and 300 in mind, a kit 400 can be developed that is useful for connecting a wiper blade and multiple types of wiper arms. In particular, the kit 400 includes a container 402 that includes within its interior one of each of the previously described connectors 100, 200 and 300 as shown in FIG. 24. The kit can also include one or more wiper blades 404, such as those distributed under the Rain-X trademark by ITW Global Brands. Depending on the type of wiper blade(s) included a suitable base 102, 202, 302 will be associated with the receiving elements 104, 204, 304 of the connectors 100, 200, 300. The shape of the container 402 can vary without departing from the spirit of the invention. For example, there could be a separate compartment for each connector and wiper blade(s). There could be a separate compartment for the wiper blade(s) and a separate compartment where all of the connectors 100, 200, 300 are housed. The separate compartments could also house other windshield wiper items, such as film for a wiper blade and instructions on how to connect the various connectors with a wiper blade and a wiper arm. Other examples of possible containers are described in a pending U.S. regular patent application filed on the same day of filing as the present application, having the title of PACKAGING AND KIT FOR WINDSHIELD WIPERS AND WINDSHIELD WIPER ACCESSORIES, client reference number ITW 61969, the entire contents of which are incorporated herein by reference.

In another variation of a kit, the kit includes the container 402 which contains the previously described connector 100 of FIGS. 1-7 that is dedicated to the class of J-hook wiper arms. In addition, the kit includes having the container 402 include a hybrid connector 500 that is dedicated to two classes of wiper arms—channel-type and pin type wiper arms. From those two classes, the hybrid connector 500 is able to connect two types of wiper arms for each class. Thus, the kit with the connector 100 and the hybrid connector 500 is able to connect three classes of wiper arms and six types of wiper arms. In addition, the kit can contain other windshield wiper items, such as film for a wiper blade and instructions on how to connect the various connectors with a wiper blade and a wiper arm.

FIGS. 25-31 show a connector 500 for connecting a wiper blade and multiple types of wiper arms. The connector 500 includes a base 502 that is used to attach the connector 500 to a wiper blade. In particular, the underside of the base 502 includes flexible fingers that engage a bracket positioned in the central portion of the wiper blade. An example of a possible wiper blade for the connector 500 to be attached to is the wiper blade sold under the name Latitude and distributed under the Rain-X trademark by ITW Global Brands. Note that the base 502 can be revised so as to allow attachment to other types of wiper blades, such as wiper blades made by ADM21 Co., LTD., Anco, Bosch, Corea Autoparts Producing Corp., KCW Corporation, Proline, Trico and Valeo.

The connector 500 includes a receiving element 504 that contains many of the features of receiving elements 204 and 304 when combined. In particular, the receiving element 504 is pivotably attached to a top portion of the base 502. In particular, the receiving element 504 has a pair of holes (not shown) that face opposite one another. The holes receive pins 507 (see FIG. 25B) formed on a central raised portion of the base 502. Thus, the receiving element 504 is able to pivot about the pins 507.

As will be explained hereafter, the receiving element 504 has a structure to receive and be connected to at least two different channel-type wiper arms, such as PTB wiper arm 234 (see FIG. 22B(1) and I & L wiper arm 232 (see FIG. 22B(2).

Figure 25A:
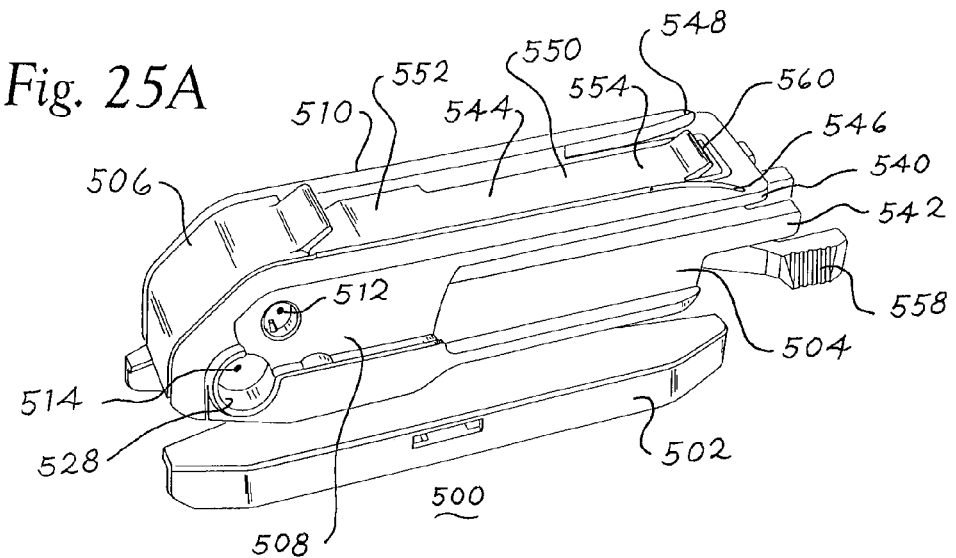
FIG. 25A shows a perspective view of a fourth embodiment of a connector in accordance with the present invention.
Figure 25B:
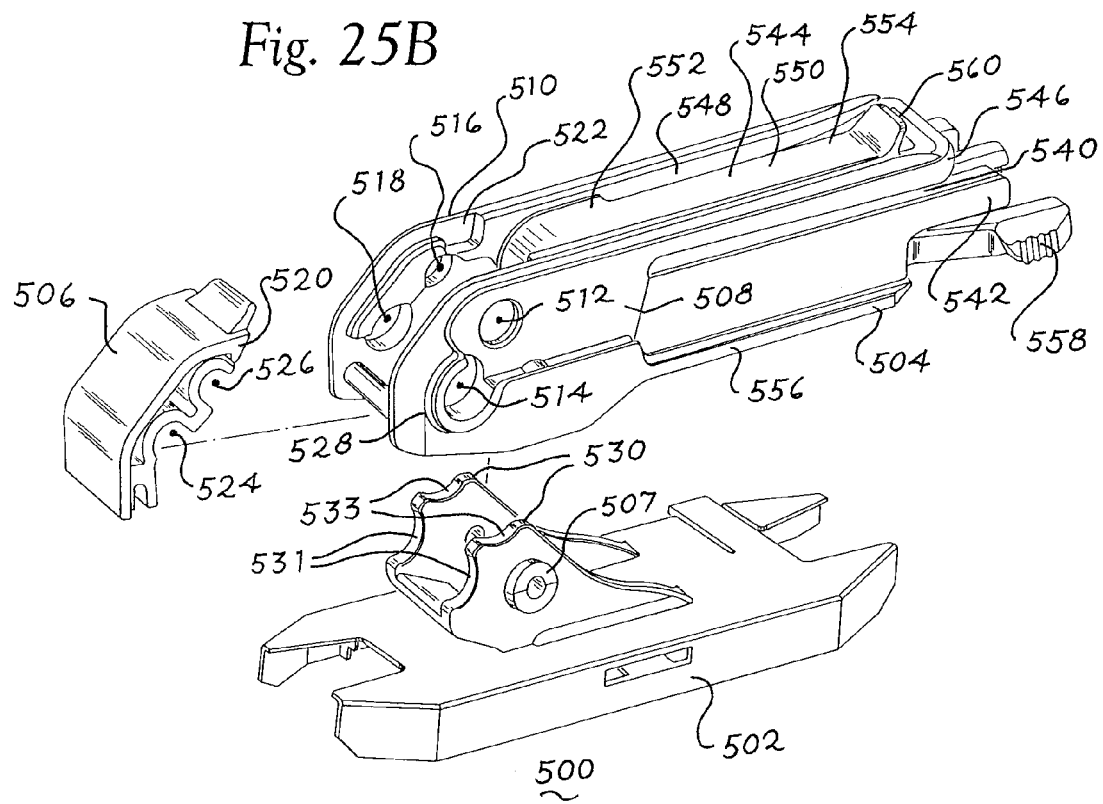
FIG. 25B shows an exploded view of the connector of FIG. 25A.
Figure 26:
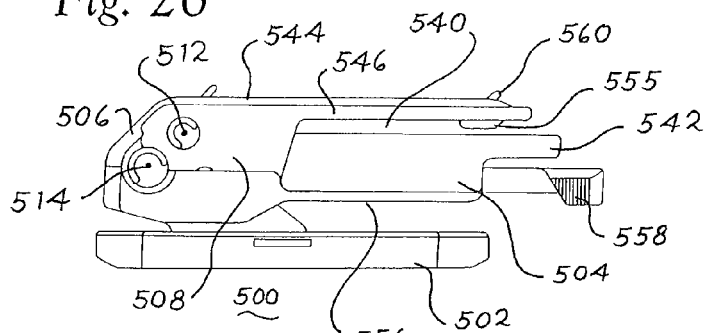
FIG. 26 shows a left side view of the connector of FIG. 25A.
Figure 27:
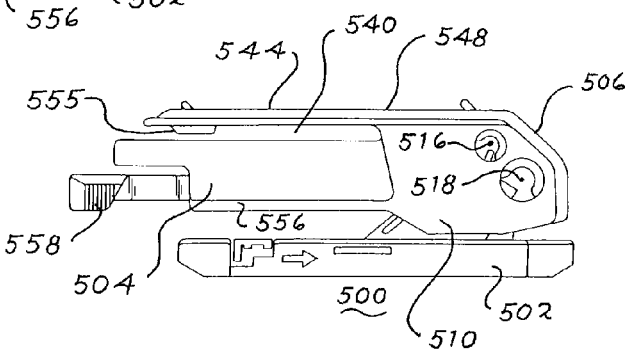
FIG. 27 shows a right side view of the connector of FIG. 25A.
Figure 28:
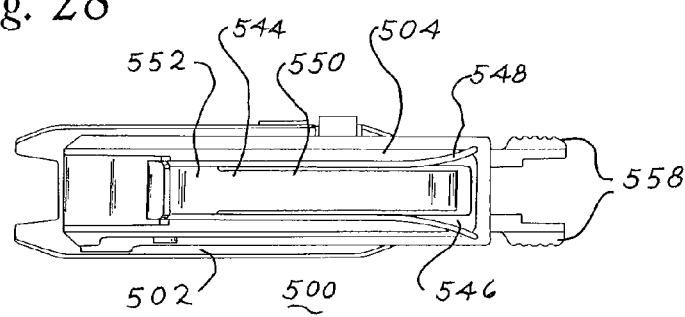
FIG. 28 shows a top view of the connector of FIG. 25A.
Figure 29:
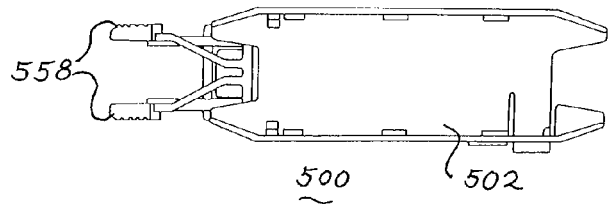
FIG. 29 shows a bottom view of the connector of FIG. 25A.
Figure 30:
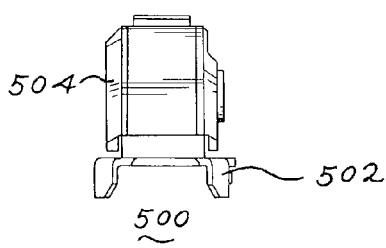
FIG. 30 shows a front view of the connector of FIG. 25A.
Figure 31:
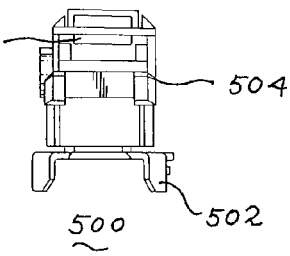
FIG. 31 shows a rear view of the connector of FIG. 25A.

In the case of the PTB wiper arm 234, the entire wiper arm 234 is aligned with a slot 540 that is defined by the space between a support surface 542 of the receiving element 504 and an engagement surface 544 that is spaced apart from and facing the support surface 542. The slot 540 is dimensioned to snugly receive a top surface 210 of the aligned distal end of the PTB wiper arm 234 that is inserted into the slot 540. As shown in FIGS. 25A-B and 28, the engagement surface 544 includes a first side support 546 and a second side support 548 that faces the first side support 546. The engagement surface 544 further includes an engagement tongue 550, wherein one end 552 of the engagement tongue 550 is attached to both side supports 546, 548 and an opposite end 554 of the engagement tongue 550 is unattached and has a protrusion 555 on the bottom surface of the engagement tongue 550 that faces the support surface 542. The first side support 546 and the second side support 548 move independently of the engagement tongue 550 and vice versa.

Once the top surface 210 of the PTB wiper arm 234 is inserted into the slot 540, the PTB wiper arm 234 is pushed further into the slot 540 toward the locking cap 506 of the receiving element 504 until the protrusion on the bottom surface of the engagement tongue 550 snaps into a rectangular opening 212 of the top surface 210 of the PTB wiper arm 234. When the snapping sound of insertion of the protrusion 555 through the opening 212 is heard, it signals that the PTB wiper arm 234 is attached to the connector 500. Note that during insertion of the PTB wiper arm 234, side flanges 214 of the arm 234 engage lower edges 556 of the support surface 542 of the receiving element 504. In addition, at the locked position, shoulders 216 of the PTB wiper arm 234 are trapped from going significantly in a direction away from the locking cap 506 by a pair of flexible wing stops 558 that face one another. The flexible wing stops 558 can be pressed towards one another along a direction that is perpendicular to a longitudinal axis of the slot 540.

Removal of the PTB wiper arm 234 that is locked in position is accomplished by pivoting upward a release notch 560 on the top surface of the engagement tongue 550. Such pivoting causes the protrusion on the bottom surface of the engagement tongue 550 to be removed from the opening 212 and so the PTB wiper arm 234 can be pulled out of the slot 540 once the flexible wing stops 558 are pressed towards one another.

Attachment of the I & L wiper arm 232 to the connector 500 is accomplished by first angling and aligning the distal end of the wiper arm 232 so that it will be inserted into the slot 540 and a channel defined between the side walls of the support surface 542. Such angling is needed so that a front edge of curved portion of the I & L wiper arm 232 can be freely inserted into the slot 540. Note that the slot 540 and the channel abut one another and are in fluid communication with one another with the channel being positioned nearer locking cap 506 of the connector 500 than the slot 540. Once the curved portion is inserted into the slot 540, the I & L wiper arm 232 is pivoted downward and the top surface of the I & L wiper arm 232 is pushed into the slot 540 toward the locking cap 506. Pushing of the wiper arm 232 is continued until shoulders 220 ride over the top surfaces of the wing stops 558 and the shoulders 220 pass the wing stops 558. At this point the wing stops 558 snap behind the shoulders 220 thus preventing the I & L wiper arm 232 from being moved out of the slot 540. At this point also, the curved portion enters the channel and engages a shoulder that has a shape complementary to the shape of the curved portion. When the snapping sound of insertion of the wing stops 558 is heard, it signals that the I & L wiper arm 232 is attached to the connector 500.

Removal of the I & L wiper arm 232 that is locked in position is accomplished by squeezing the wing stops 558 towards each other so as to allow the shoulders 220 to move past the wing stops 558 and away from the locking cap 506. With this configuration, the I & L wiper arm 232 can be removed from the slot 540.

As shown in FIGS. 25A-B, the receiving element 504 has a structure to receive and be connected to two different sizes of pin wiper arms. For example, receiving element 504 can be attached to pin arm wiper arms 332, 334 as shown in FIGS. 22C(1)-(2). For such attachment, a locking cap or cover 506 is pivoted to an open position. Pivoting of the locking cap 506 is accomplished by a pair of pins (not shown) that face opposite one another at a lower end of the locking cap 506. The pins are inserted into corresponding openings formed in opposing side walls 508 and 510 of the receiving element 504. Thus, the locking cap 506 pivots about an axis aligned with the pins from the open position to a closed position shown in FIGS. 25A and 26-31.

Note that while connector 500 has been described so that the receiving element 504 and locking cap 506 pivot about different axes of rotation, it is possible to reconfigure the connector 500 so that the receiving element 504 and locking cap 506 pivot about a common axis of rotation.

With the locking cap 506 in the open position, a pin wiper arm can be attached to the connector 500 via receiving element 504. The connector 500 can accommodate multiple sizes of pin arms, such as the small and large wiper pins 332, 334. This is accomplished in part by forming a pair of recesses or openings 512 and 514 in side wall 508 and oppositely facing and identically sized recesses or openings 516 and 518 formed in the side wall 510. The upper recesses 512 and 516 have a diameter so as to correspond to the diameter of the distal portion of a small pin wiper arm 332.

Similarly, the lower recesses 514 and 518 have a diameter so as to correspond to the diameter of the distal portion of a large pin wiper arm 334.

Attachment of either the large pin wiper arm 334 or the small pin wiper arm 332 is accomplished in a similar manner. In the case of attachment of the large pin wiper arm 334, the distal end 360 is aligned with the recess 514. Next, the distal end 360 is inserted through the recess 514 until the distal end 360 is received within recess 518 and extends slightly past the exterior of side wall 510. At this position, the locking cap 506 is pivoted to the closed position wherein side protrusions 520 of the locking cap 506 engage indents 522 formed in the side walls 508 and 510. Engagement in the indents 512 by the side protrusions 520 causes a snapping sound, which signals that the pin wiper arm is locked into attachment with the connector 500. Note that in the closed position, a c-shaped indent or surface 524 engages the middle portion 362 of the pin wiper arm 334 and presses the pin in general against the edges of the recesses 514 and 518. The c-shaped indent or surface 524 preferably has a shape that corresponds to the shape of the middle portion 362. Similarly, when the small pin wiper arm 332 is attached via insertion through recesses 512, 516, a smaller c-shaped surface 526 engages a middle portion of the pin wiper arm 332 when locking cap 506 is closed. Removal of the pin wiper arm 332 is accomplished by moving the locking cap 506 to the open position and pulling the distal end of the pin wiper arm 332 through the recesses 514 and 516.

Note that the receiving element 504 includes a c-shaped collar 528 that extends away from the recess 514 and side wall 508 so as to prevent the distal end of the wiper arm from extending too much past the recess 518 and exterior of side wall 510.

As mentioned previously, moving the cover cap 506 to the closed position locks the pin wiper arm into position. It should be pointed out that during the insertion of the pin wiper arm 332, 334 into the receiving element 504, the distal end of pin wiper arm 332, 334 engages either indents 531 or indents 533 of pivot stop 530 of the base 502 (see FIG. 25B) that are positioned within the interior of the receiving element 504. Such engagement depends on whether the pin wiper arm is inserted into recesses 512, 516 or recesses 514, 518. In addition, simultaneous engagement of the pin wiper arm to the recesses and the indents prevents the receiving element 504 from pivoting relative to the base 502.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims. In addition, design aspects of the connectors 100, 200, 300 and 500 in whole or without their respective bases 102, 202, 302 and 502 are possible.

We claim:

1. A connector for connecting a wiper blade and a wiper arm, the connector comprising:
 a base for attachment to a wiper blade;
 a receiving element directly attached to and pivotable with respect to said base and said receiving element is arranged above said base as viewed along a vertical direction, wherein said receiving element has a structure for attachment to only one class of wiper arm, said receiving element comprising:
 a support surface;
 a flexible engagement surface spaced from and facing said support surface as viewed along said vertical direction, wherein said engagement surface is substantially parallel to said support surface along entire length of said engagement surface, wherein said flexible engagement surface and said support surface define a slot therebetween to snugly receive a surface of a wiper arm, and wherein said slot extends along a length of said engagement surface as viewed along a horizontal direction that is perpendicular to said vertical direction, and said support surface and said engagement surface define a side opening that is unencumbered by any portion of said receiving element when a first axis, which has no end points and is parallel to a lateral direction that is perpendicular to both said vertical direction and said horizontal direction, passes through said side opening and does not intersect said receiving element in any way, wherein said engagement surface comprises:
 a first side support;
 a second side support that faces said first side support; and
 an engagement tongue, wherein one end of said engagement tongue is attached to both said first side support and said second side support and an opposite end of said engagement tongue is unattached and has a protrusion that faces said support surface.

2. The connector of claim 1, wherein the first side support and said second side support move independently of said engagement tongue and vice versa.

3. The connector of claim 1, wherein said support further comprises a pair of flexible wing stops that face one another and can be pressed towards one another along a direction that is perpendicular to a longitudinal axis of said slot.

4. The connector of claim 1, wherein said class is channel arm type wiper arms.

5. The connector of claim 4, wherein said one class of wiper arm encompasses either an I & L wiper arm or a PTB wiper arm.

6. The connector of claim 1, wherein said protrusion pivots about an axis that is perpendicular to said longitudinal direction and pivots towards or away from said base.

7. A connector for connecting a wiper blade and a wiper arm, the connector comprising:
 a base for attachment to a wiper blade, wherein said base comprises a pivot stop;
 a receiving element pivotably attached to said base, wherein said receiving element only receives two classes of wiper arms, said receiving element comprising:
 an attachment that pivotably couples said receiving element to said base;
 a recess structured to receive a first wiper arm, wherein said pivot stop is positioned adjacent to said recess, wherein when said first wiper arm is received by said recess, said pivot stop engages said first wiper arm and prevents said receiving element from pivoting relative to said base;
 a support surface comprising a pair of flexible wing stops that face one another and can be pressed towards one another;
 a flexible engagement surface spaced from and facing said support surface, said flexible engagement surface and said support surface define a slot dimensioned to snugly receive a surface of a second wiper arm, wherein said engagement surface comprises:

a first side support;

a second side support that faces said first side support; and an engagement tongue, wherein one end of said engagement tongue is attached to both said first side support and said second side support and an opposite end of said engagement tongue is unattached and has a protrusion that faces said support surface.

8. The connector of claim 7, wherein the first side support and said second side support move independently of said engagement tongue and vice versa.

9. The connector of claim 7, wherein said engagement tongue comprises a release notch that is located on a side opposite of said protrusion.

10. The connector of claim 7, wherein said pair of flexible wing stops can be pressed towards one another along a direction that is perpendicular to a longitudinal axis of said slot.

11. The connector of claim 7, wherein said pivot stop is integral with said base.

12. The connector of claim 7, wherein said receiving element has a structure to receive and be connected to at least four different wiper arms belonging to said only two classes of wiper arms.

13. The connector of claim 12, wherein said at least four different wiper arms are an I & L wiper arm, a PTB wiper arm, a first pin wiper arm and a second pin wiper.

14. The connector of claim 7, wherein said receiving element comprises a cap that has an indent, wherein said cap pivots from an open position to a closed position, wherein at said closed position, said indent engages said wiper arm received by said recess.

15. The connector of claim 7, wherein said receiving element comprises a second recess to receive a wiper arm and wherein said receiving element comprises a cap that has a pair of indents, wherein said cap pivots from an open position to a closed position, wherein at said closed position, said indent engages said wiper arm received by either said recess or said second recess.

16. The connector of claim 7, wherein said only two classes of wiper arms are channel-like wiper arms and pin-type wiper arms.

17. The connector of claim 7, wherein said protrusion pivots about an axis that is perpendicular to said longitudinal direction and pivots towards or away from said base.

18. The connector of claim 7, wherein said receiving element extends along a longitudinal direction and said flexible engagement surface is spaced from and facing said support surface in a direction perpendicular to said longitudinal direction and toward said base, wherein said flexible engagement surface and said slot extend along said longitudinal direction.

* * * * *